US005373450A

United States Patent [19]

Gallagher et al.

[11] Patent Number: 5,373,450

[45] Date of Patent: Dec. 13, 1994

[54] MAILING MACHINE INCLUDING IMPROVED TAPE DISPENSING MEANS AND CONTROL SYSTEM THEREFOR

[75] Inventors: Dennis M. Gallagher, Danbury; Thomas M. Pfeifer, Bridgeport; Richard P. Schoonmaker, Wilton, all of Conn.

[73] Assignee: Pitney Bowes Inc., Stamford, Conn.

[21] Appl. No.: 997,986

[22] Filed: Dec. 28, 1992

[51] Int. Cl.[5] ........................ G06F 15/46; B65B 59/00

[52] U.S. Cl. ................................ 364/478; 364/464.02; 221/15

[58] Field of Search .............. 364/478, 464.02, 464.03; 318/314, 341, 599, 601, 603, 618, 619, 622, 632, 636, 653; 360/78; 221/15, 231, 258, 277, 198; 271/10, 116, 126; 156/64, 204, 364, 366, 368; 118/703

[56] References Cited

U.S. PATENT DOCUMENTS

| | | | |
|---|---|---|---|
| 4,492,315 | 1/1985 | Hooper | 221/198 |
| 4,665,353 | 5/1987 | Salazar et al. | 318/599 |
| 5,197,629 | 3/1993 | Sanchez | 221/15 |
| 5,217,551 | 6/1993 | Nobile et al. | 156/64 |
| 5,251,554 | 10/1993 | Eckert, Jr. et al. | 364/464.02 |

*Primary Examiner*—Stephen M. Baker
*Assistant Examiner*—Jim Trammell
*Attorney, Agent, or Firm*—Melvin J. Scolnick; David E. Pitchenik; Steven J. Shapiro

[57] ABSTRACT

A mailing machine for processing respective sheets including envelopes which each have a body and a flap and including cut tapes which each have a substrate portion and an adhesive tape portion removably connected thereto, the machine comprising, structure for feeding each sheet in a predetermined path of travel extending downstream through the machine, the sheet feeding structure including oppositely spaced input rollers defining a nip therebetween, structure for feeding a cut tape, structure for controlling the feeding structure, the controlling structure including a microprocessor, the controlling structure including structure upstream from the nip of the input rollers for sensing a sheet fed to the machine and providing a corresponding first sensing signal to the microprocessor, the microprocessor programmed for causing the sheet feeding structure to commence feeding in response to receiving the first sensing signal, the controlling structure including a switch connected to the microprocessor and providing a switch signal thereto in response to actuation of the switch, and the microprocessor programmed for causing the sheet feeding structure followed by the cut tape feeding structure to commence feeding in response to receiving the switch signal.

13 Claims, 7 Drawing Sheets

MAILING MACHINE INCLUDING IMPROVED TAPE DISPENSING MEANS AND CONTROL SYSTEM THEREFOR

BACKGROUND OF THE INVENTION

This invention is generally concerned with a machine including improved means for dispensing cut tapes and, more particularly, with a mailing machine including improved tape dispensing means and a control system therefor.

As shown in U.S. Pat. No. 4,639,918 for a Diagnostic Keyboard for a Mailing Machine, issued Jan. 27, 1987 to Linkowski and assigned to the assignee of the present invention, it is known in the art to provide a mailing machine which includes a microcomputer for controlling structures for feeding a sheet downstream in a path of travel and printing postage indicia on the sheet, and which includes a sensor for sensing the leading edge of a sheet fed through the machine, wherein the microprocessor is programmed to respond to a signal from the sensor to delay indicia printing for a predetermined time interval to locate the postage indicia a predetermined distance upstream from the leading edge of the sheet. Further, as shown in the '918 patent, it is known in the art to connect a plurality of selectively manually actuatable switches to the microprocessor and program the microprocessor to respond to actuation of one or more of the switches to select one of a plurality of different delay time intervals for locating the postage indicia different distances from the leading edge of a sheet.

As shown in U.S. patent application Ser. No. 07/978,020, for a Machine Including Means For Selecting The Marginal Distance From Sheet Leading Edge For Printing Indicia On Sheet, filed Nov. 13, 1992, by Dennis Gallagher, et. al., and assigned to the assignee of the present invention, there is disclosed an improved mailing machine including tape dispensing structure, and an improvement in the margin selecting structure of the aforesaid '918 patent, including the provision a plurality of light emitting diodes for displaying the selected, different, distances at which indicia printing will be set back from the leading edge of the sheet.

In the aforesaid application concerning an improved mailing machine, details of the tape dispensing structure and its operation are not disclosed due to tapes being fed to the machine in the same manner as the other sheets discussed in the application. Moreover, in the aforesaid prior art mailing machine, preparatory to feeding stuffed envelopes, a service person is normally called in to adjust the marginal distance of set back from the leading edge of an envelope at which the postage indicia will be printed, in order to be sure that the indicia is set back a sufficient distance to avoid poor printing quality occasioned by printing on a stuffed envelope's "stepped" portion, i.e., an edge set back from the leading edge and raised by the envelope's contents. If the machine is thereafter used for printing postage indicia on a length of cut tape, which has a standardized overall length of six inches, the marginal distance of set back of the indicia from the leading edge of the tape has to be changed if the customer wants to be able to print two postage indicia on a single tape in order to avoid waste. Moreover, it is noted that in high volume mail processing environments wherein a one-half cent savings in postage costs per letter or parcel is perceived to be a significant savings, tape wastage is not tolerated. Accordingly, the service person would have to be called in adjust the marginal distance before using the machine for tape printing purposes. And, since this procedure is time consuming and unacceptably expensive in high volume mail processing environments, the customer's level of satisfaction with the machine is greatly adversely effected. Accordingly:

an object of the invention is to provide an improved mailing machine including improved tape feeding structure and means for separately selectively adjusting the marginal distances from the leading edge of a tape or envelope at which an indicia will be printed thereon; and another object is to provide a mailing machine including means for separately displaying each of a plurality of selected marginal distances of displacement from the leading edge of a tape or envelope at which postage indicia will be printed.

SUMMARY OF THE INVENTION

A mailing machine for processing respective sheets including envelopes which each have a body and a flap and including cut tapes which each have a substrate portion and an adhesive tape portion removably connected thereto, the machine comprising, means for feeding each sheet in a predetermined path of travel extending downstream through the machine, the sheet feeding means including oppositely spaced input rollers defining a nip therebetween, means for feeding a cut tape, means for controlling the feeding means, the controlling means including a microprocessor, the controlling means including means upstream from the nip of the input rollers for sensing a sheet fed to the machine and providing a corresponding first sensing signal to the microprocessor, the microprocessor programmed for causing the sheet feeding means to commence feeding in response to receiving the first sensing signal, the controlling means including a switch connected to the microprocessor and providing a switch signal thereto in response to actuation of the switch, and the microprocessor programmed for causing the sheet feeding means followed by the cut tape feeding means to commence feeding in response to receiving the switch signal.

BRIEF DESCRIPTION OF THE DRAWINGS

As shown in the drawings wherein like reference numerals designate like or corresponding parts throughout the several views.

DESCRIPTION OF THE PREFERRED EMBODIMENTS

Figure 1:
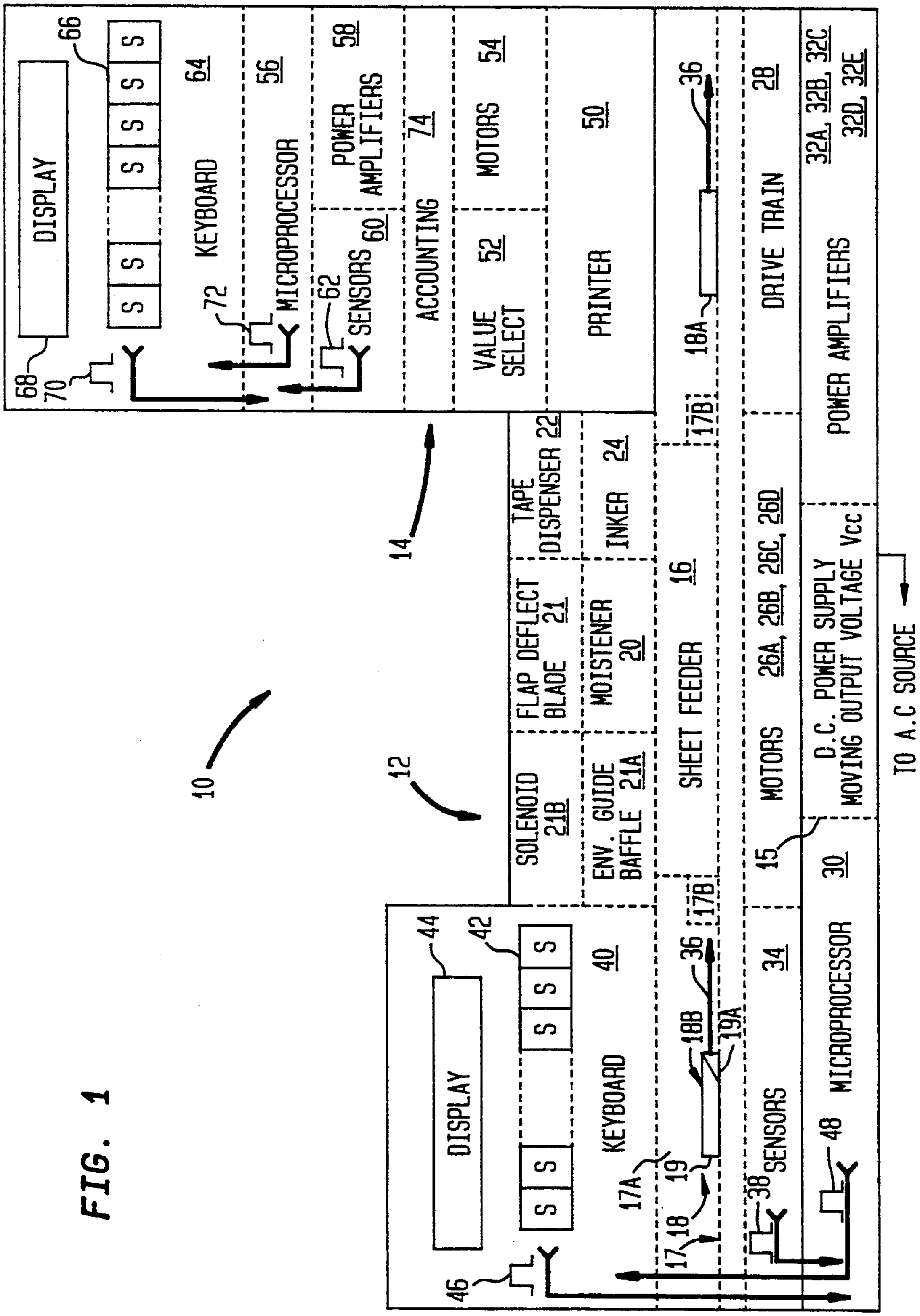
FIG. 1 is a schematic view of an improved mailing machine according to the invention.
Figure 2:
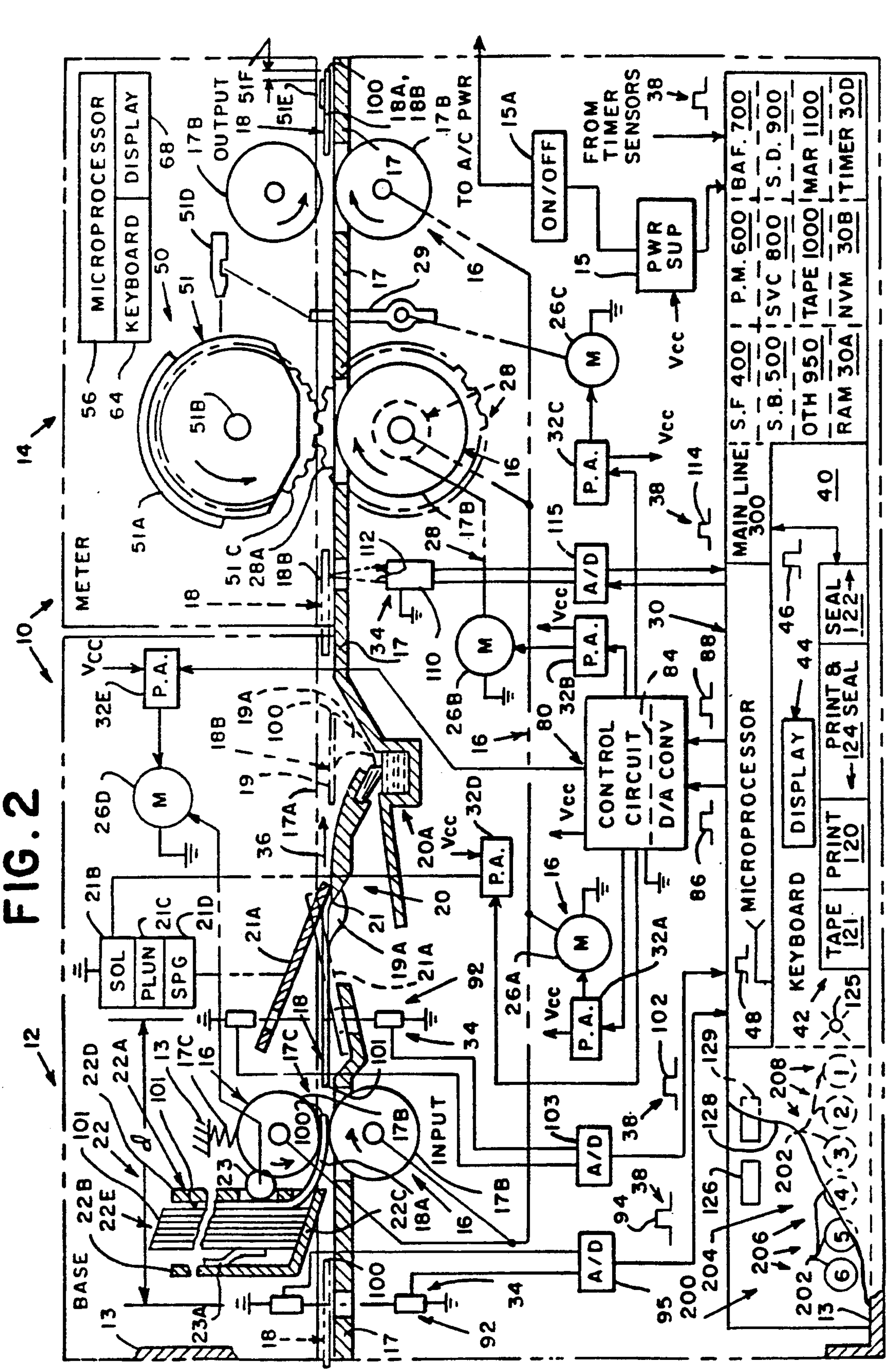
FIG. 2 is a schematic view of the mailing machine of FIG. 1 showing the improved tape feeding structure thereof, and showing the envelope feeding, flap guiding, flap deflecting and moistening, printing and sensing structures thereof.

As shown in FIGS. 1 and 2, a mailing machine 10 according to the invention generally includes an improved mailing machine base 12, having suitable framework 13 for supporting the various components thereof, and includes a conventional postage meter 14 which is suitably removably connected to the base 12.

The mailing machine base 12 (FIGS. 1 and 2) preferably includes a conventional source of supply 15 of d.c. power, having a d.c. output voltage level Vcc. The d.c. supply 15 is suitably adapted to be connected to an external source of supply of a.c. power via a two position, i.e., "on" and "off", power switch 15A, for energization thereof, and thus of the base 12. In addition, the base 12 comprises conventional sheet feeding structure 16, including an elongate horizontally-extending deck 17, an upright registration fence 17A extending alongside of and longitudinally of the length of the deck 17, and, preferably, a plurality of rollers 17B, including oppositely disposed input feed rollers, for feeding successive sheets 18 on the deck 17 through the machine 10. Preferably the upper input feed roller 17B (FIG. 2) is conventionally spring urged downwardly toward the oppositely disposed lower input feed roller 17B by means of a spring 17C. Without departing from the spirit and scope of the invention, a given sheet 18, having a leading edge 100 and a trailing edge 101, may be a cut tape 18A, a card, or folded or unfolded letter, or a sealed or unsealed envelope 18B having a body 19, and having a flap 19A. And, the envelope body 19 may be stuffed with one or more cards, folded or unfolded letters, invoices, remittance slips or return envelopes, or other sheets 18. In addition, the mailing machine base 12 includes envelope flap moistening structure 20, including a suitable source of supply of water 20A and a suitable envelope flap deflecting blade 21 for guiding envelope flaps 19A into moistening relationship with the moistening structure 20. Further, the mailing machine 12 includes a baffle 21A, and includes a solenoid 21B having a plunger 21C which is connected to the baffle 21A and loaded by a spring 21D, such that the solenoid 21B is operable against the force of the spring 21D to pivotably move the baffle 21A above the deck 17, for guiding sheets 18 toward the flap deflecting blade 21 for moistening, and such that the solenoid 21B is operable for permitting the spring 21D to position the baffle 21A beneath the deck 17, for guiding sheets 18 away from the flap deflecting blade 21 for bypassing the moistening structure 20. Moreover, the base 12 preferably includes cut tape dispensing structure 22, including a suitable receptacle 22A having a rear wall 22B, base wall 22C and front wall 22D. The receptacle 22A overhangs the deck 17 upstream from the input sheet feeding rollers 17B for receiving and storing a stack 22E of cut tapes 18A, having a standardized length of substantially six inches (6″). In addition, the cut tape dispensing structure 22 preferably includes a tape feeding roller 23 which extends through an aperture formed in the receptacle's front wall 22D for disposition in feeding engagement with the cut tape stack 22E for feeding the cut tapes 18A one at a time from the receptacle 22A against the force exerted by a spring 23A. The spring 23A preferably extends from the receptacle's rear wall 22B and is disposed for resiliently urging the cut tape stack 22E toward the tape feed roller 23. And, the base 12 preferably includes conventional inking structure 24, such as a suitable source of supply of ink, which may be a reservoir of ink or an ink saturated roller and one or more rollers associated therewith for transferring ink therefrom to the printing structure, hereinafter discussed, of the postage meter 14. Still further, the mailing machine base 12 preferably includes a plurality of conventional d.c. motors 26A, 26B, 26C and 26D, one of which, 26A, is suitably connected to the sheet feeding structure 16, for operation thereof, another of which, 26B, is suitably connected to a conventional drive train 28, including a drive gear 28A which is constructed and arranged for transferring motive power to the postage meter 14 for driving the printing structure hereinafter discussed, another of which, 26C, is suitably connected to the shutter bar lever arm 29 for moving a shutter bar, as hereinafter discussed, into and out of locking engagement with a postage meter drum drive gear driven by the gear 28A and, another of which, 26D, is preferably directly connected to the tape feeding roller 23 for feeding cut tapes 18A one at a time towards the input feed rollers 17B into the nip 17C defined thereby between the input sheet feeding rollers 17B for feeding thereby from the receptacle 22A and thus from the tape stack 22E.

For controlling the mailing machine base 12 (FIGS. 1 and 2), the base 12 generally includes a conventional microprocessor 30, and a plurality power amplifiers 32A, 32B, 32C, 32D and 32E which are each connected to a different one of the motors and solenoid 26A, 26B, 26C, 26D and 21B. And, for controlling the base 12, the base 12 preferably includes the control circuit 80 hereinafter described for controlling each of the power amplifiers 32A, 32B, 32C, 32D and 32E, and thus the motors and solenoid 26A, 26B, 26C, 26D and 21B. Further, for controlling the base 12, the base 12 includes a plurality of conventional sensors 34 which are suitably located relative to one or more components of the sheet feeding structure 16, baffle 21A, solenoid 21B, cut tape dispensing structure 22 inking structure 24, motors 26A, 26B, 26C and 26D, and drive train 28, and relative to the path of travel 36 of respective sheets 18 fed through the machine 10, for providing signals, such as the signal 38, to the microprocessor 30 which are indicative of the position of the plunger of the solenoid 21B, of the angular velocity of the respective motors 26A, 26B, 26C and 26D, of the position of the baffle 21A, tape feeding roller 23 and selected components of the drive train and sheet feeding structures, 16 and 28, of one or more positions of selected components of the structures 22, 24 and 26, of the available supply of water or ink, as the case may be, in the moistening and inking structures, 20 and 24, and of one or more positions of a given sheet 18, including a given cut tape 18A or envelope 18B, in the path of travel 36. Still further, for controlling the mailing machine base 12, the base 12 additionally comprises a conventional keyboard 40, including a plurality of switches 42 and a suitable display 44 which are conventionally electrically connected to the microprocessor 30 for providing thereto conventional signals, such as the signal 46, for causing the microprocessor 30 to control the base 12, and receiving therefrom conventional signals, such as the signal 48, for driving the display 44. Moreover, the microprocessor 30 is conventionally programmed for, inter alia, responding to signals 38 received from the sensors 34, and to signals 46 received from the keyboard 40 due to manual actuation of the switches 42, for timely causing operation of the motors 26A, 26B, 26C and 26D, and thus of the drive train 28, tape feed roller 23 and sheet feeding structures 16 and 28, and timely causing operation of the solenoid 21B, to cause envelopes 18B to be transported by the sheet feeding structure 16, guided into or out of flap deflecting relationship with the flap deflecting blade 21 by the envelope guiding baffle 21A, for timely causing tapes to be fed from the receptacle 22A to the nip of the input sheet feeding rollers 17B for feeding thereby from the receptacle 22A and into the path of travel 36 for transport by the sheet feeding structure 16, for timely causing sheets 18, including tapes 18A and envelopes 18B, to be transported by the sheet feeding structure 16 through the machine 10, and for timely causing the printing structure of the postage meter 14 to print postage indicia 51E on the respective sheets 18, including tapes 18A and envelopes 18B. And, to that end, the microprocessor 30 is preferably programmed according to the invention to include a main line program 300 (FIG. 3) and a plurality of conventional sub-programs, including, inter alia, a sheet feeding routine 400 (FIG. 2), shutter bar routine 500, postage meter printing routine 600, envelope guiding baffle routine 700, service routine 800, shut-down routine 900, and other conventional routines 950 for implementing the aforesaid functions and other functions hereinafter discussed. In addition, according to the invention the microprocessor 30 is preferably programmed to include the tape feeding routine 1000 (FIG. 6) and the margin-adjusting routine 1100 (FIG. 5) hereinafter discussed in detail.

The postage meter 14 (FIGS. 1 and 2) preferably comprises conventional postage indicia printing structure 50, which is preferably a conventional rotary printing drum 51, having a suitable printing die 51A for printing the indicia 51E on a sheet 18 the selected marginal distance 51F from the leading edge 100 of the sheet 18. In addition, the postage meter 14 includes a drum drive shaft 51B on which there is mounted a drum drive gear 51C which is dimensioned for meshing engagement with the drive train gear 28A of the mailing machine base 12. Accordingly, the postage meter 14 is constructed and arranged for interfacing with the drive train 28 of the mailing machine base 12 when the postage meter 14 is removably connected thereto. Further, the postage meter 14 includes a shutter bar 51D, which is conventionally disposed in bearing engagement with the shutter bar lever arm 29, when the meter 14 is connected to the base 12, for movement by the lever arm 29 into and out of locking engagement with the drum drive gear 51C. For changing the postage value of the postage indicia 51E printed by the die 51A, the postage meter 14 additionally includes conventional value selection structure 52, such as a plurality of conventional printing wheels and a drive train therefor, and also includes one or more motors 54, such as stepper motors, which are respectively conventionally coupled to the drive trains of the value selection structure 52.

For controlling the postage meter 14 (FIGS. 1 and 2) the postage meter 14 includes a conventional microprocessor 56, and includes one or more power amplifiers 58 which are respectively connected between the microprocessor 56 and a different motor 54. Further, for controlling the postage meter 14, the meter 14 includes a plurality of conventional sensors 60 which are suitably located relative to one or more components of the printing structure 50, value selection structure 52, motors 54 and the path of travel 36 of respective sheets 18 fed through the machine 10, for providing signals, such as the signal 62, to the microprocessor 56 which are indicative of one or more positions of selected components of the structures 50, 52 and 54, and of one or more positions of a given sheet 18, in the path of travel 36. Still further, for controlling the postage meter 14, the meter 14 additionally comprises a conventional keyboard 64, including a plurality of suitable switches 66 and a suitable display 68 which are conventionally electrically connected to the microprocessor 56 for providing thereto conventional signals, such as the signal 70, for causing the microprocessor 56 to control the postage meter 14, and for receiving therefrom conventional signals, such as the signal 72, for driving the display 68. Moreover, for controlling the postage meter 14, the meter 14 includes conventional accounting structure 74. The accounting structure 74 is suitably electrically connected to the microprocessor 56 for communicating therewith, and includes, inter alia, data stored therein which corresponds to the current total value of postage available for printing by the meter 14, the current total value of postage printed by the meter 14 and the serial number of the meter 14. And, for controlling the meter 14, the microprocessor 56 is conventionally programmed, inter alia, for responding to value selection signals 70 received from the keyboard 64 due to manual actuation of the switches 66, for causing the microprocessor 56 to energize the motors 54, thereby causing the value selection structure 52 to position the print wheels to print an indicia 51E having a postage value corresponding to the value selection signals 70, for causing the microprocessor 56 to access the accounting structure 74 to determine whether or not sufficient total postage is available for printing and, if so, to deduct therefrom an amount corresponding to the value selection signals 70 and to add the same amount to the total value printed, and, for causing the printing structure 50 to be unlocked to permit the printing of single postage indicia 51E, including the amount corresponding to the value selection signals 70, on a given sheet 18 under the control of the postage meter base 12.

As shown in FIG. 2, the postage meter base 14 preferably includes at least one multiple channel, pulse width modulated (PWM), load control circuit 80, which is connected to the microprocessor 30. The circuit 80 includes digital to analog converter structure 84 having clock "c" and data "d" input leads electrically connected to the microprocessor 30 for receiving conventional signals, such as the signals 86 and 88, from the microprocessor 30 for controlling the converter structure 84, and thus the control circuit 80, for selectively providing different pulse width modulated signals to each of the power amplifiers 32A, 32B, 32C, 32D and 32E, for driving the respective motors 26A, 26B, 26C and 26D, and the solenoid 21B. A more detailed description of the control circuit 80 may be found in U.S. patent application Ser. No. 07/983912 for a Mailing Machine Including Multiple Channel Pulse Width Modulated Signal Circuit, filed Dec. 1, 1992 by T. Pfeiffer, et. al. and assigned to the assignee of the present invention (Applicant's file C-968).

As shown in FIG. 2, sheets 18, including tapes 18A and envelopes 18B, fed through the machine 10 are fed downstream in the path of travel 36, as indicated by the arrow. Preferably, one of the sensors 34, i.e., sensor 92, is located upstream from the sheet feeding rollers 17B of the mailing machine base 10 for sensing respective sheets 18, but not tapes 18A, as they are initially fed to the machine 10 and providing a signal 38 to the microprocessor 30, such as the signal 94 via an analog to digital converter 95, indicating that a sheet 18 has been fed to the machine 10. In addition, one of the sensors 34, i.e., sensor 96, is located downstream from the sensor 92, and from the input feed rollers 17B, i.e., the feed rollers 17B located upstream of the guide baffle 21A, for sensing the leading edges 100 of successive sheets 18, including cut tapes 18A, as they are initially fed downstream in the path of travel 36 by the input sheet feeding rollers 17B, and providing a trip signal 34 to the microprocessor 30, such as the signal 102 via an analog to digital converter 103, indicating that a sheet 18, including a tape 18A, has been initially fed by the machine 10. And, one of the sensors 34, i.e., sensor 110, is preferably a reflective sensor which senses light 112 generated thereby and reflected from a sheet 18, in the path of travel 36, for providing a signal 34 to the microprocessor 30, such as the signal 114 via an analog to digital converter 115, indicating that a sheet 18 is substantially ready for printing thereon.

In addition, for controlling operation of the base 12 (FIG. 2) the keyboard switches 42 are preferably a plurality of manually depressible switching keys including a print only mode key 120, which is manually actuatable for causing the base 12 to enter into a sheet feeding and printing mode of operation. Further, the keyboard switches 42 include a tape key 121 which is normally manually actuatable to cause the base 12 to enter into a tape feeding, sheet feeding and printing mode of operation, wherein a tape 18A is fed to the nip 17C of the input sheet feeding rollers 17B and fed thereby from the tape stack receptacle 22A and out of engagement with the flap deflecting blade 21 and thus out of engagement with the moistening structure 20. In addition, the keyboard switches 42 include a seal-only mode key 122, which is normally manually actuatable for causing the base 12 to enter into a sheet feeding but no printing mode of operation wherein an envelope 18B is fed into engagement with the flap deflecting blade 21, moistened by the moistening structure 20 and sealed by the sheet feeding rollers 17B in the course of being fed through the postage meter 14. Moreover, the keyboard switches 42 include a print and seal key 124, which is normally manually actuatable for causing the base 12 to enter into a sheet feeding, flap deflecting, moistening and printing mode of operation. Further, for providing a visual indication to an operator concerning a trouble or error condition in the machine 10, the keyboard 40 preferably includes a service lamp 125, which is preferably intermittently energized in a light blinking mode of operation in response to appropriate signals 48 from the microprocessor 30 whenever the base 12 is in need of servicing, for example, due to the occurrence of a jam condition event in the course of operation thereof. For redundantly storing critical data, including a plurality of error codes, utilized for operation of the base 12 in various modes of operation thereof, the microprocessor 30 is preferably one of the type which not only includes a random access memory (RAM) 30A, but also includes a suitable non-volatile memory (NVM) 30B for storing such data, including error codes, without loss thereof due to power failure or during power-down conditions. Accordingly, the microprocessor 30 preferably includes an electrically erasable, programmable, read only, memory (EEPROM) 30B for storing such data, including error codes corresponding to malfunction conditions which occur at any time during energization of the machine 10.

Moreover, for controlling operation of the base 12 (FIG. 2), the base 12 preferably includes a manually actuatable test key 126 which is disposed within the base 12, beneath a cover 128 suitably mounted to the framework 13, for access upon removal of the cover 128, to normally permit use solely by manufacturing and maintenance, i.e., service, personnel. Accordingly, the test key 126 is preferably connected to the framework 13 beneath the cover 128 for normally preventing access thereto by an operator of the machine 10. The test key 126 is conventionally electrically connected to the microprocessor 30 and is manually actuatable to provide appropriate signals 46 to the microprocessor 30 for causing the base 12 to enter into a service mode of operation wherein a predetermined one of the print only, print and seal or seal only keys, 120, 122 or 124, is actuatable for increasing, and another predetermined one of such keys, 120, 122, or 124 is actuatable for decreasing, the marginal or set-back distance 51F from the leading edge 100 of an envelope or tape, 18A or 18B, at which postage indicia 51E will be printed thereon, and wherein stored data corresponding the error codes identifying respective malfunction conditions can be retrieved and displayed on the display 44. Preferably for human factors purposes, the mode key 120, 122 or 124 which is predetermined for decreasing the marginal distance 51F of set back is the right-most key 122 of the switches 42, that is, the seal key 122, and the predetermined key 120, 122 or 124 for increasing the marginal distance 51F of set back is the key adjacent to the seal key 122, that is, the print and seal key 124. And, for ease of identity of such keys, 122 and 124, with the direction of set back, the seal only key 122 preferably includes an arrow formed therein which points downstream, and the print and seal key 124 includes an arrow formed therein which points upstream, relative to the path of travel of the leading edge 100 a tape 18A or envelope 18B. Further, the base 12, and in particular the keyboard 40, preferably includes a clear key 129 which is manually actuatable, when the base 12 is in the service mode of operation thereof, for clearing from both the RAM 30A and EEPROM 30B the data corresponding to error codes stored therein. Moreover, for the purposes of this disclosure, unless otherwise stated, actuation of a given key, 120, 121, 122, 124, 126 or 129, means that the relevant key has been moved, and holding the key moved for any length of time before release does not have any additional effect.

According to the invention, the base 12 (FIG. 1) additionally includes structure 200 for on the one hand displaying error codes and on the other hand displaying increments of marginal displacement of the postage indicia 51E from the leading edge of a sheet 18 including a tape 18A. The displaying structure 200 preferably includes six light emitting diodes (LEDs) 202 which are preferably connected to the framework 13 beneath the cover 128 to normally deny access by an operator of the machine 10 and permit access by service personnel. The LEDs 202 are preferably arranged in a linearly-extending array 204 including a first set, 206 of three LEDs 202 to the left in the array 204, and a second set, 208, of three LEDs 202 to the right in the array 204, to facilitate permitting service personnel to read from the first LED set 206 a first octal code corresponding to the first digit of a two digit error code, and to read from the second LED set 208 a second octal code corresponding the second digit of the two digit error code. Although the LED array 204 may be used for the display of 64 different octal error codes, the octal codes "00" and "77" are not used, due to their display being susceptible of interpretation that the displaying structure 200 is inoperative. Further, the octal codes 01 through 06 are preferably not used as "error" codes, but rather as codes which identify different machine models. And, the octal code 07 is preferably not used as an "error" code, but rather, according to the invention, as a prompt to signify to the service person that the base 12 is in the margin-adjust mode of operation wherein a choice may be made between exiting the margin-adjust mode or adjusting the indicia printing margin for either an envelope 18A or a tape 18B. Aside from the foregoing it is noted that whenever the base 12 is energized, and an error condition occurs as hereinafter discussed, the appropriate data corresponding to the error code is stored in both the RAM 30A and NVM 30B as data corresponding to a current malfunction condition code. On the other hand, whenever the base 12 is deenergized and thereafter re-energized the data corresponding to current malfunction condition error codes stored in the RAM 30A are cleared therefrom, and the data corresponding to error codes which were concurrently stored in the NVM 30B remain stored therein as data corresponding to historical malfunction condition codes. For the purposes of this disclosure when reference is made to storing an error code, such phraseology should be understood to mean that data corresponding to the error code is stored. Accordingly, error codes stored in both the RAM 30A and NVM 30B correspond to current malfunction condition codes, whereas error codes stored only in the NVM 30B correspond to historical malfunction condition codes.

Figure 3A:
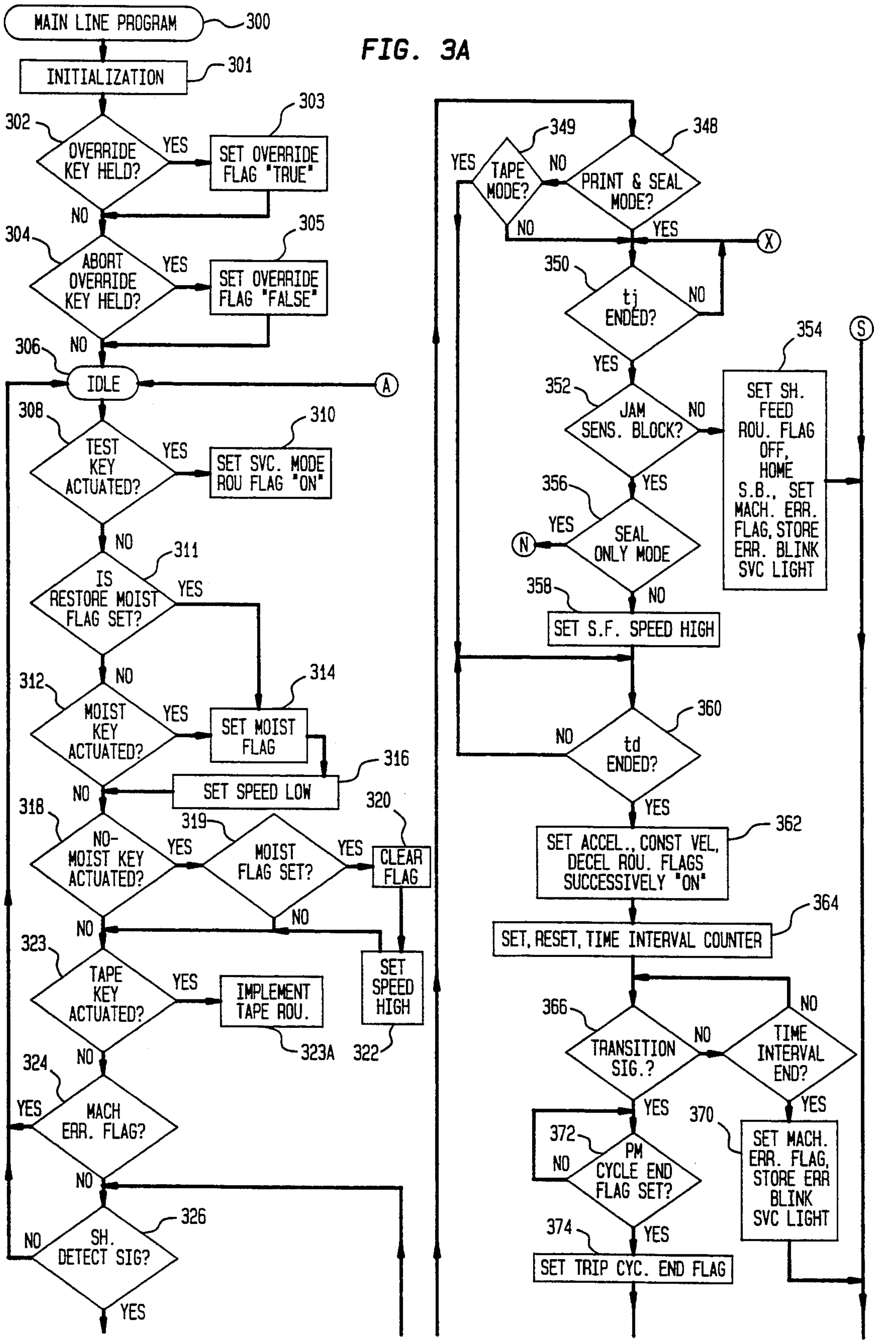
FIG. 3 a flow chart of the main line program according to the invention.
Figure 3B:
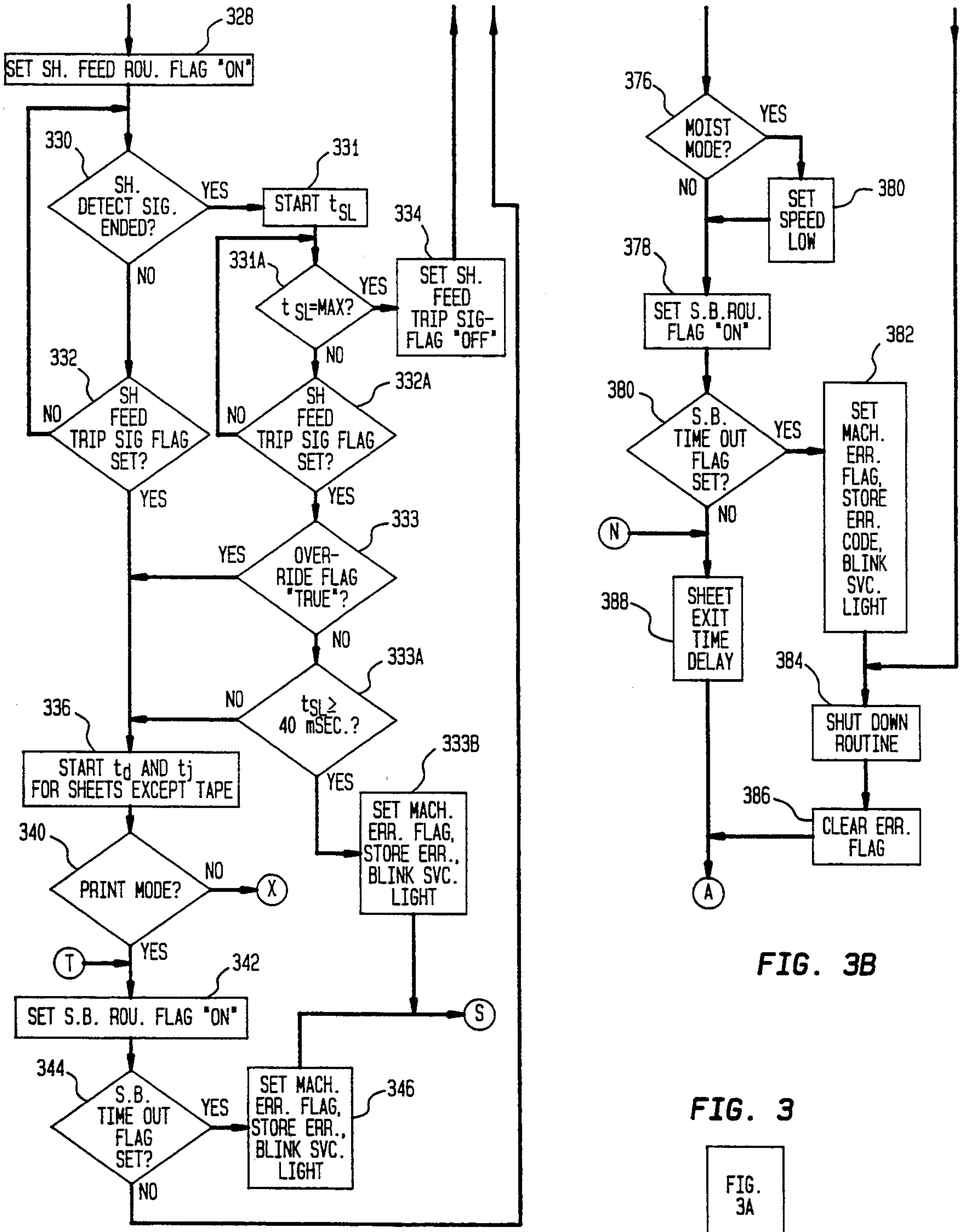
Figure 3:
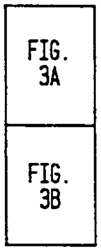

Upon manual movement of the power switch 15A (FIG. 2) to the "on" position, the base 12 and thus the microprocessor 30 is conventionally energized. Whereupon the microprocessor 30 commences execution of the main line program 300 (FIG. 3). The main line program 300, commences with the step 301 of causing the microprocessor 30 to initialize, which generally entails setting the voltage levels for the various sensors 34, including the sensors 92, 96 and 110, motors 26A, 26B, 26C and 26D, solenoid 21B, clock and data leads 86 and 88, and if they are not in their respective home positions, driving the motors 26A, 26B and 26C thereto. In addition, the initialization step 301 preferably includes the function of operating the solenoid 21B for positioning the baffle 21A beneath the deck 17, and thus in the non-flap moistening position thereof. Further, the initialization step preferably includes setting the sheet feeding speed for use by the sheet feeding routine 400 to a high sheet feeding speed, i.e., preferably twenty-six inches per second (26"/sec.), as distinguished from a low speed, i.e. preferably seventeen and one-half inches per second (17 ½"/sec.). Thereafter, the main line program 300 causes the microprocessor 30 to execute the step 302 of determining whether the override key, that is, a predetermined one of the keys, 120, 121, 122 or 124, and preferably the tape key 121, is held actuated. In this connection it is noted that, as hereinafter discussed, the program 300 includes process steps for determining whether a given sheet 18 fed to the machine 10 is less than a predetermined minimum length of substantially four and three-quarters inches (4 ¾"), as hereinafter discussed, and, if it is, shutting down the sheet feeding and printing operations of the machine 10. And, that such process steps are desirable on a world-wide basis except, most notably, in Japan, where envelopes are not fed lengthwise through mailing machines, but rather are fed widthwise therethrough, as a result of which the aforesaid process steps, concluding with machine shut down upon detection of a sheet of less than the predetermined minimum length, are undesirable. Thus, the base 12 includes the provision of the override key, 120, 121, 122 or 124, which is actuatable for causing the microprocessor 30 to override implementation of the shut-down steps associated with minimum sheet-length processing. In addition, in order to abort the override process to accommodate, for example, installing in another country a mailing machine 10 which was installed in Japan, the base 12 additionally includes the provision of an abort-override key which is actuatable for causing the microprocessor 30 to execute steps which re-enable implementation of minimum sheet-length processing. Accordingly, referring back to step 302, and assuming that the override key 120, 121, 122 or 124 is held actuated, then, the program 300 causes the microprocessor 30 to execute the step 303 of setting an override flag "true" or "on" for use as hereinafter discussed. Assuming however, that the inquiry of step 302 is negatively answered, or that step 303 was executed when the machine 10 was previously energized, then, the main line program 300 causes the microprocessor 30 to execute the step 304 of determining whether an abort-override key, that is, a predetermined different one of the keys 120, 121, 122 or 124, and preferably the seal only key 122, is held actuated. Assuming that the inquiry of step 304 is affirmative, then, the program 300 causes the microprocessor 30 to execute the step 305 of setting the override flag "flase" or "off" for use as hereinafter discussed. And, assuming that the inquiry of step 304 is negatively answered, or that step 305 was executed when the machine 10 was previously energized, then, the main line program 300 causes the microprocessor 30 to execute the step 306 of entering into an idle loop routine.

As thus constructed and arranged the operator has an opportunity to hold either the override or abort-override key, 120, 121, 122 or 124 (FIG. 2), depressed, when the power switch 15A is actuated, to cause the main line program 300 (FIG. 3) to set an override flag either "true" or "flase" for use in disabling or re-enabling the minimum-length processing as hereafter discussed. Further, as thus constructed and arranged, assuming disablement of minimum sheet length processing, re-enablement cannot occur until the abort-override key, 120, 121, 122 or 124, is held depressed, and, assuming re-enablement of minimum sheet-length processing, disablement cannot occur until the override key is held depressed. Moreover, as a practical matter, since the inquiries of steps 302 and 304 are implemented by the microprocessor 30 soon after actuation of the power switch 15A, for energization of the machine 10, both of the inquiries of steps 302 and 304 will be negatively answered unless the appropriate override or abort-override key 120, 121, 122 or 124, is held actuated at the time of actuation of the power switch 15A.

As shown in FIG. 3, the idle loop 306, commences with the step 308 of determining whether or not the test key 126 (FIG. 2) has been actuated. Assuming that the test key 126 is actuated, step 308 (FIG. 3), then, the program 300 causes the microprocessor 30 to execute the step 310 of calling up and causing implementation of the service mode routine 800 (FIG. 4) hereinafter discussed, in the course of which the error codes stored in the memories 30A (FIG. 2) and 30B, and the selected marginal distances 51F from the leading edge 100 of a tape 18A or envelope 18B at which the indicia 51E will be printed, may be displayed on the display 44, followed by returning processing to idle, step 306 (FIG. 3). Assuming however, that the test key 126 is not actuated, step 308, then, the program 300 causes the microprocessor to execute the step 311 of determining whether the restore moistening flag is set, which, as hereinafter discussed, is an inquiry concerned with whether or not the tape routine 1000 (FIG. 6) according to the invention has progressed sufficiently to cause the microprocessor 30 to set the restore moistening flag in the main line program 300 so that when a sheet 18, other than a tape 18A, is fed to the machine 10, the baffle 21A will be returned to the flap moistening position. Assuming that the inquiry of step 311 is affirmatively answered, then, step 311 is followed by execution of step 314 as hereinafter discussed. If however, step 311 is negatively answered, then, the program 300 causes the microprocessor 30 to execute the step 312 of determining whether or not a moistening key, i.e., one or the other of the seal only or print and seal keys, 122 or 124, has been actuated. Assuming the inquiry of step 312 is affirmatively answered, or that the inquiry of step 311 is affirmatively answered, then, the program 300 causes the microprocessor 30 to execute the step 314 of setting a moistening flag, resulting in the microprocessor 30 (FIG. 2) calling up and implementing the baffle routine 700, for causing the solenoid 21B to be operated to raise the baffle 21A to the position thereof wherein envelopes 18B fed to the base 12 are guided by the baffle 21A into engagement with the envelope flap deflecting blade 21 for downstream moistening by the moistening structure 20. Thereafter the program 300 causes the microprocessor 30 to execute the step 316 of causing the microprocessor 30 to set the sheet feeding speed of the sheet feeding routine 400 to the "low" speed of preferably 17 ½" per second. Accordingly, if the tape routine 1000 has progressed sufficiently to permit the baffle 21A to be moved into the flap moistening position thereof, and, in addition, one or the other of the moistening keys, 122 or 124 (FIG. 2), is actuated, then, the baffle 21A is located in the envelope flap moistening position for guiding envelopes 18B into engagement with flap deflecting blade 21, and the sheet feeding speed is reduced. In this connection, it is noted that the "low" speed is a speed which is lower than the sheet feeding speed of 26"/second set in the course of microprocessor initialization, step 301 (FIG. 3), and thus less than the speed at which tapes 18A are fed through the machine 10 and the printing structure 50 (FIG. 2) of the postage meter 14 prints indicia 51E on an envelope 18B.

Assuming however, that the inquiry of step 312 (FIG. 3) is negatively answered, or that step 316 has been executed, then, the program 300 causes the microprocessor 30 to execute the step 318 of determining whether the no-moisten key, i.e., the print only key 120, has been actuated. Assuming the inquiry of step 318 is affirmatively answered, the program 300 causes the microprocessor 30 to execute the step 319 of determining whether the moistening flag is set, due to steps 314 and 316 or the tape feeding routine 1000 (FIG. 6) having been previously implemented, and, assuming that it is, the program 300 causes (FIG. 8) the microprocessor 30 to execute the step 320 of clearing the moistening flag, which results in causing the microprocessor 30 to implementing the baffle routine 700 (FIG. 2) for causing the solenoid 21B to be deenergized to permit the spring 21D to urge the baffle 21A downwardly to the position thereof beneath the deck 17 wherein the baffle 21A guides envelopes 18B, or other sheets 18 fed to the machine 10, out of engagement with the envelope flap deflecting blade 21 and thereover for bypassing the flap moistening function of the moistening structure 20. Moreover, following execution of step 320 (FIG. 3), the program 300 causes the microprocessor 30 to set the sheet feeding speed of the sheet feeding routine 400 to the high speed of preferably 26"/second, which corresponds to the linear speed of the periphery of the postage indicia printing drum 51 when printing indicia 51E on a given sheet 18. Thus, if the non-moistening, or print only key, 120 (FIG. 2), is actuated, the baffle 21A is located in the non-flap moistening position, if it is not already so located, for guiding envelopes 18B out of engagement with the flap deflecting blade 21, and the sheet feeding speed is increased. Thereafter, assuming that steps 319, 320 and 322 are executed, or that the inquiries of steps 318 or 319 are is negatively answered, the program 300 causes the microprocessor 30 to execute the step 323 of determining whether or not the tape key 121 (FIG. 2) has been actuated. Assuming the inquiry of step 323 is affirmatively answered, then, the program 300 causes the microprocessor 30 to execute the step 323A of calling up and implementing tape feeding routine 1000 (FIG. 6) hereinafter discussed. If however, the inquiry of step 323 is negatively answered, then, the program 300 causes the microprocessor 30 to execute the step 324 of determining whether a machine error flag has been set.

As hereinafter discussed in greater detail, a machine error flag is set, step 324 (FIG. 3), due to the occurrence of various events, including, for example, that the sheet feeding structure 16 (FIG. 1) has been jammed in the course of feeding a sheet 18 through the machine 10, that the shutter bar 51D (FIG. 2) has not been fully moved in the course of movement thereof either out of or into locking engagement with the drum drive gear 51C, or that the meter drive train 28 has become jammed in the course of driving the same. Assuming a machine error flag has been set, step 324 (FIG. 3), then, the program 300 returns processing to idle 306, until the condition causing the error flag to be set is cured and the error flag is cleared, and a determination is thereafter, made that an error flag is not set, step 324. Thereafter, the program 300 causes the microprocessor 30 to implement the step 326 of determining whether a sheet detection signal 94 (FIG. 2) has been received from the sensor 92 due to a sheet 18, but not a tape 18A, having been fed to the machine 10. Assuming a sheet 18 has not been fed to the machine 10, with the result that a sheet detection signal 96 has not been received, step 326 (FIG. 3), then, the program 300 causes the microprocessor 30 to return processing to idle, step 306, and to thereafter continuously loop through steps 308 through 326, as appropriate, until the sheet detection signal 94 is received. Whereupon, the program 300 causes the microprocessor 30 to implement the step 328 of setting the sheet feeder routine flag "on", which results in the program 300 calling up and implementing the sheet feeding routine 400 (FIG. 2). Thus the machine 10 responds to the detection of a sheet 18, but not a tape 18A, fed to the machine 10 by commencing implementation of the sheet feeding routine 400 for feeding the sheet 18 through the machine 10.

As the sheet feeding routine 400 (FIG. 2) is being implemented, the program 300 (FIG. 3) concurrently causes the microprocessor 30 to implement the step of 330 of determining whether the sheet detection signal 94 has ended, that is, whether the trailing edge 101 (FIG. 2) of a sheet 18, but not a tape 18A, being fed downstream in the path of travel 36 by the input sheet feeding rollers 17B has unblocked the sensor 92. Assuming the sensor 92 is not unblocked, then, the program 300 (FIG. 3) causes the microprocessor 30 to implement the step 332 of determining whether the sheet feeding trip signal flag has been set, indicating that the sensor 96 (FIG. 2) has detected the leading edge 100 of the sheet 18, but not a tape 18A, and provided a trip signal 102 to the microprocessor 30. Assuming the microprocessor 30 determines that the sheet detection signal 94 has not ended, step 330 (FIG. 3) and, in addition, that the sheet feeding trip signal flag has not been set, step 332, then, the program 300 cuases the microprocessor 30 to return processing to step 330 and continuously successively implement steps 330 and 332 until the sheet feeding trip signal 102 is received, step 332, before the sheet detection signal 94 is ended, step 330, or the sheet detection signal 94 is ended, step 330, before the sheet feeding trip signal 102 is received, step 332.

Assuming the sheet feeding trip signal is received, step 332 (FIG. 3) before the sheet detection signal is ended, step 330, then, the program 300 causes the microprocessor 18 to execute the step 336 of starting two the of timers 30D (FIG. 2) to separately commence counting two predetermined time intervals, td and tj, from the time instant that the leading edge 100 of a sheet 18, other than a tape 18A, is sensed by the sheet detection sensor 96. The time delay td is a predetermined time delay before the microprocessor 30 will commence driving the printing motor 26B and thus the drum 51 through a printing cycle commencing with accelerating the postage printing drum 51 from rest. And the time delay which tj is a predetermined time delay, which is less than or equal to the time delay td, permitted to lapse before it may be concluded that a malfunction, or jam condition, has occurred at the flap deflecting blade 21, due, for example, to a sealed envelope 18B having been fed to the machine 10 when the baffle 21A is positioned for guiding sheets 18 into engagement with the flap deflecting blade 21. Accordingly, the counts of each of the time intervals, td and tj, is commenced if the program 300 determines that the sensors 92 and 96 (FIG. 2) are concurrently blocked, indicating that the operator has fed a sheet 18 to the machine 10 which is longer than the physical distance "d", of substantially six inches (6"), between the sensors 92 and 96, and that the operator has not withdrawn the sheet 18 before the input sheet feeding rollers 17B have fed the sheet 18 into blocking relationship with the trip sensor 96.

Assuming however that the sheet detection signal is ended, step 330 (FIG. 3), before the trip signal is received, step 332, then, the program 300 causes the microprocessor 30 to start a third timer 30D (FIG. 2) to commence counting a predetermined sheet-length time delay tsl. In this connection it is noted that if the length of the sheet 18 fed to the machine 10 is less than the physical distance "d" of substantially 6" between the sensors 92 and 96, and either is or is not also less than a minimum desirable length of preferably substantially four and three-quarters inches ($4\frac{3}{4}$") and, in addition, is not withdrawn by the operator after having been fed into sensing relationship with the sensor 92, then, the inquiry of step 330 will be affirmatively answered before the inquiry of step 332 is affirmatively answered, with the result that the program 300 causes the microprocessor 30 to execute step 331. In addition, it is noted that the program steps 331A through 333B are provided to discriminate between sheets 18 which are not of sufficient length to span the physical distance "d" of substantially 6" between the sensors, 94 and 96, but may or may not by less than the minimum desirable processing length, and to stop processing such sheets 18 which have a length of less than the desirable minimum length of substantially $4\frac{3}{4}$" unless the override key 120, 121, 122 or 124 has been actuated as hereinbefore discussed. In this connection it is noted that due to steps 331A through 333B, as appropriate, being executed when the sheet feeding speed is set at either the "low " speed of $17\frac{1}{2}$"/second or the "high" speed of 26"/second, sheets 18 having an overall, longitudinal, length of $4\frac{1}{2}$" or less will always be found to be less than the minimum desirable length of substantially $4\frac{3}{4}$" and those having a length of 5" or more will always be found to be greater. And, at "high" speed, sheets 18 of less than 5" in length will always be found to be less than the minimum acceptable length of substantially $4\frac{3}{4}$", whereas sheets 18 of 5" or more in length will always be found to be greater than the minimum acceptable length of substantially $4\frac{3}{4}$. Accordingly, substantially $4\frac{3}{4}$" is intended to means $4\frac{1}{2}$" to 5" in length.

With the above thoughts in mind, following execution of step 331 (FIG. 3) the program 300 causes the microprocessor 30 to execute the step 331A of determining whether the sheet length time interval tsi is equal to a maximum predetermined time interval of preferably one (1) second. Assuming the inquiry of step 331A is negative, the program 300 causes the microprocessor 30 to execute the step of determining whether the sheet feed trip signal flag is set, i.e., the sheet 18 (FIG. 2) fed to the machine 10 has been detected by the trip sensor 96, a signal 104 corresponding to such detection has been provided to the microprocessor 30 and a flag corresponding thereto has been set thereby. Thereafter, the program 300 (FIG. 3) causes the microprocessor 30 to continuously loop through steps 331A and 332A, until the inquiry of step 331A is affirmatively answered before the inquiry of step 332A is affirmatively answered, or the inquiry of step 332A is affirmatively answered before the inquiry of step 331A is affirmatively answered. Assuming the inquiry of step 332A is affirmatively answered before the inquiry of step 331A is affirmatively answered, then, the program 300 causes the microprocessor 30 to execute the step 333 of determining whether the override flag setting is "true" or "on", indicating that minimum sheet-length processing should be discontinued. Accordingly, assuming the inquiry of step 333 is affirmative, processing proceeds to step 336 which is, as hereinbefore discussed, the step to which processing proceeded when a determination was made in steps 330 and 332 that both sensors 92 and 96 were blocked by a sheet 18 having a length equal to or greater than the physical distance "d" of six inches between the sensors 92 and 96. Or, otherwise stated, an affirmative response to the inquiry of step 333 results in minimum sheet-length processing being ended and sheet processing to proceed as if the sheet length were acceptable.

On the other hand, assuming the inquiry of step 333 (FIG. 3) is negatively answered, then, the program 300 causes the microprocessor 30 to execute the step 333A of determining whether the sheet length time interval tsl is greater than or equal to a time period of substantially 40 milliseconds. Assuming a sheet feeding speed of 26" per second, if the inquiry of step 333A is negatively answered, then the given sheet 18 is equal to or more than the minimum desirable length of 5", since within less than forty milliseconds from the trailing edge 101 of a given sheet 18 unblocking the sheet detection sensor 92, step 330, the leading edge 100 of the sheet 18 has been detected by the trip sensor 96. As a result, the program 300 causes the microprocessor 30 to proceed to execution of step 336. If however the inquiry of step 333A is affirmatively answered, indicating that the given sheet is less than the minimum acceptable length of 5" at the sheet feeding speed of 26"/second, since at least 40 milliseconds has passed since the sheet's trailing edge 101 unblocked the sheet detection sensor 92 and the sheet leading edge 100 blocked the trip sensor 96, then, the program 30 causes the microprocessor 30 to execute the step 333B of setting a machine error flag, storing an error code corresponding to a short-sheet, or undesirable sheet length, and blinking the service light 125 to visually display the malfunction condition. Referring back to step 331A, and assuming that the maximum sheet length time interval is one second, and, the inquiry of step 331A is affirmatively answered before the inquiry of step 332A is affirmatively answered, then, the program 300 causes the microprocessor 30 to execute the step 334 of setting the sheet feeding trip signal flag "off" for shutting down processing of the sheet feeding routine 400, followed by returning processing the step 326 to await the next sheet detection signal 94. In this connection it is noted that if one second elapses from the time instant that the sheet detection sensor 92 is unblocked, step 330, and the trip sensor 96 is still not blocked, step 332A, then, it may be concluded that the operator has withdrawn the sheet 18 from the machine 10.

Thereafter, the program 300 (FIG. 3) causes the microprocessor 30 to execute the step 340 of determining whether the base 12 is in a print mode of operation as a result of the operator having actuated either one or the other of the print only or print and seal keys, 120 (FIG. 2) or 124. Assuming the inquiry of step 340 (FIG. 3) is negatively answered, then, the program 300 concludes that the base 12 is in the no-print, or seal only, mode of operation, as a result of the operator having actuated the seal only key 122 (FIG. 2). Assuming that the seal only key 122 has been actuated, step 340 (FIG. 3), indicating that the operator has chosen to use the base 12 (FIG. 2) for sheet moistening and sealing purposes and not to use the postage meter 14 for printing purposes, then, the program 300 (FIG. 3) bypasses all printing related steps, including the step 342 of causing the microprocessor 30 to move the shutter bar 51D out of locking engagement with the drum drive gear 51C, and causes the microprocessor 30 to implement the step 350 of determining whether the jam time delay tj has ended. Assuming that the jam time delay tj has not ended, then, the program 300 causes the microprocessor 30 to continuously loop through step 350 until the jam time delay tj has ended. Whereupon the program 300 causes the microprocessor 30 to execute the step 352 of determining whether the jam sensor 110 (FIG. 2) is blocked. Assuming as is the normal case that the inquiry of step 352 is affirmative, indicating that the sheet 18 has been fed beyond the flap deflecting blade 21 and has not therefore been jammed against the blade 21, then, the routine 300 causes the microprocessor 30 to execute the step 356 of again determining whether the machine 10 is in the seal only mode, since the processing commencing with step 350 follows either step 340 or step 348. Assuming the inquiry of step 356 is affirmative, then, the program 300 causes the microprocessor 30 to bypass subsequent printing related steps, including the step 362 of causing the microprocessor 30 to call-up and execute the postage printing drum driving routine 600, and instead, causes the microprocessor 30 to execute the step 388 of implementing a time delay of sufficient length to permit the sheet 18 to be fed from the machine 10, followed by returning processing to idle 306. Referring back to step 340 and assuming that the inquiry thereof is affirmatively answered, indicating that the machine 10 is in either one of the printing modes of operation due to the operator having has actuated either the print only key 120, to cause the baffle 21A to be positioned for guiding sheets 18 fed to the machine 10 out of engagement with the flap deflecting blade 21 for bypassing the moistening structure 20, or the print and seal key 124, to cause the baffle 21A to be positioned for guiding sheets 18 into engagement with the flap deflecting blade 21 for flap moistening purposes, then, the program 300 (FIG. 3) implements the step 342 of setting the shutter bar routine flag "on", which results in the program 300 causing the microprocessor 30 to call up and implement the shutter bar routine 500 for driving the shutter bar 51D (FIG. 2) out of locking engagement with the drum drive gear 51.

As the microprocessor 30 (FIG. 2) implements the shutter bar routine 500, the program 300 (FIG. 3) concurrently causes the microprocessor 30 to implement the step 344 of determining whether a shutter bar time-out flag has been set, indicating at this juncture that either the postage meter 14 (FIG. 2) is improperly mounted on the base 12 or has for reasons beyond the scope of this invention prevented movement of the shutter bar 51D out of locking engagement with the drum drive gear 51, or the shutter bar 51D has been stopped due to a malfunction condition in the base 12 which interferes with the lever arm 29 driving the shutter bar 51D. Assuming that the shutter bar time-out flag is set, step 344 (FIG. 3), then, the program 300 implements the step 346 of setting a machine error flag, storing an error code in the both the RAM 30A (FIG. 2) and EEPROM 30B and causing the keyboard service lamp 125 to commence blinking, followed by the step 384 (FIG. 3) of implementing a the shut-down routine 900 and then the step 386 of clearing the error flag and returning processing to idle 306. If however, as the normal case, that the inquiry of step 344 is negatively answered, then, the program 300 causes the microprocessor 30 to implement the step 348 of determining whether the machine 10 (FIG. 2) is in the print and seal mode of operation, due to the operator having actuated the print and seal key 124, causing the baffle 21A to be positioned for guiding envelope flaps 19A into engagement with the flap deflecting blade 21. Assuming that the machine 10 is not in the print and seal mode of operation, step 348 (FIG. 3), then, the program 300 causes the microprocessor 30 to execute step 349 of determining whether the machine 10 is in the tape mode of operation, due to the operator having actuated the tape key 121. Assuming that the machine 10 is not in the tape mode of operation, step 348, then the program 300 causes the microprocessor 30 to execute the step 360, hereinafter discussed, of determining whether the time td delay has ended. If however, the inquiry of step 348 is affirmatively answered, or the inquiry of step 349 is negatively answered, due to the operator having actuated the print and seal key 124 or not having actuated either the print and seal or tape keys, 124 or 121, then, the program 300 causes the microprocessor 30 to execute the step 350 of determining whether the jam time interval tj has ended. Assuming that the inquiry of step 350 is negative, the program 300 causes the microprocessor 30 to continuously loop through step 350 until the jam time interval tj is ended. Whereupon, the program 300 causes the microprocessor 30 to execute the step 352 of determining whether the jam sensor 110 (FIG. 2) is blocked. Assuming the jam sensor 110 is not blocked, as it should be by a sheet 18, other than a tape 18A, by the time the jam time delay tj has ended, then, the inquiry of step 352 will be negatively answered, indicating that a jam condition has occurred between the time the sheet 18, other than a tape 18A, was sensed by the trip sensor 96 and the jam time interval tj has ended. Thus the program 300 recognizes when a sheet 18 (FIG. 2), other than a tape 18A, is jammed against the flap deflecting blade 21. As a result of the negative response to the inquiry of step 352 (FIG. 3), the program 300 causes the microprocessor 30 to execute the step 354 of setting the sheet feeder routine flag off, to shut down the sheet feeding routine 400 (FIG. 2), and to execute the shutter bar routine 500 for causing the shutter bar 51D to be returned into locking engagement with the postage printing drum drive gear 51C, thereby preventing rotation of the printing drum 51. In addition, the microprocessor 30 is caused to set a machine error flag, step 354 (FIG. 3), store an error code as hereinbefore discussed, and blink the service light 125, followed by the successive steps 384 and 386 of causing the microprocessor 30 to implement the shut down routine 900, clear the error flag and return processing to idle 306. Assuming however, as is the normal case, that the inquiry of step 352 is affirmatively answered, indicating that the sheet 18 has been fed into blocking relationship with the jam sensor 110 (FIG. 2) and that a sheet 18 is not therefore jammed at the flap deflecting blade 21, then, the program 300 causes the microprocessor 30 to execute the step 356 of determining whether the machine 10 is in the seal only mode of operation thereof. Assuming the inquiry of step 356 is affirmatively answered, then the program 300 causes the microprocessor 30 to bypass all printing related steps, including the step 352 of setting the printing routine flag "on" for causing printing to be implemented, and instead, execute the step 388 of implementing the time delay permitting the sheet 18 to exit the machine 10, followed by returning processing to idle 306. If however, the inquiry of step 356 is negatively answered, indicating that printing should occur, then, the program 300 causes the microprocessor 30 to execute the step 358 of setting the sheet feeding speed of the sheet feeding routine 400 to the high speed of 26"/second, as hereinbefore discussed, followed by executing the step 360 of determining whether the time delay td has ended. Assuming the time delay td is not ended, then, the program 300 causes the microprocessor 30 to continuously loop through step 360 until the time delay td is ended. Whereupon the program 300 causes the microprocessor 30 to execute the step 362 of setting the postage meter acceleration, constant velocity and deceleration routine flags successively "on", with the result that the microprocessor 30 calls-up and successivly implements conventional postage meter drum acceleration, constant velocity and deceleration steps, that is, the postage printing routine 600 (FIG. 2).

As the postage printing routine 600 (FIG. 2) is being implemented, the program 300 (FIG. 3) concurrently implements the successive steps, 364 through 368, of successively clearing and setting a time interval counter for counting a series of predetermined fault time intervals during which the microprocessor 30 preferably receives transition signals 38 from the sensing structure 34, indicating that the postage printing drum 51 has commenced being driven from its home position, has timely achieved constant velocity, has been timely driven at the constant velocity during the printing cycle and has been timely decelerated back to rest at its home position, without having been jammed in the course of such movement, failing which, the program 300 causes the microprocessor 30 to execute the successive steps 370, 384 and 386 of setting a machine error flag, storing an error code and blinking the service light 125, followed by implementing the shutdown routine 900, clearing the error flag and returning processing to idle, step 306. Accordingly, if the postage printing drum 51 is not timely driven from and the back to its home position after commencement of implementation of the postage meter printing routine 600, step 362, the program 300 shuts down sheet processing and provides a visual indication to the operator that the mailing machine base 12, or postage meter 14, or both, are in need of servicing. At this juncture, the operator of the machine 10 may find, for example, that the drum 51 did not move from its home position, due to the postage meter 14 having insufficient funds to print the postage value entered therein by the operator for printing purposes, or some other error condition has occurred in the meter 14 which preludes driving the drum 51 from its home position. Alternatively, the operator may find that a jam condition exists in the base 12 which prevents the drum drive gear 51C from driving the drum 51. Whatever may be the reason for the drum 51 not being timely moved from and then back to its home position during the various fault time intervals, the operator would normally attempt to cure the defect in machine operation, failing which a service person would be called in to cure the defect.

However, assuming as is the normal case, that a determination is made in step 366 (FIG. 3) that all of the transition signals are timely received, i.e., before the fault time intervals are ended, step 364, then the program 300 causes the microprocessor 30 to implement the step 372 of determining whether a postage meter cycle ended flag has been set, due to the postage meter printing routine 600 having driven the drum 51 through a single printing cycle. Assuming that the postage meter cycle ended flag has not been set, step 372, then, the program 300 continuously causes the microprocessor 30 to implement step 372 until the postage meter cycle ended flag has been set. Whereupon, the program 300 causes the microprocessor 30 to implement the step 374 of setting a postage meter trip cycle complete flag. As thus constructed and arranged, in the course driving the postage printing drum 51 (FIG. 2) through a printing cycle, including acceleration of the postage meter drum 51 from its home position to a constant velocity for printing purposes and then decelerating the drum 51 back to rest at its home position, the microprocessor 30 repeatedly determines whether the difference between desired and actual movements of the drum 51 are acceptable, failing which, an error code is stored in each memory, 30A and 30B, and a shut-down routine 900 is implemented.

Assuming the postage meter printing cycle has ended, step 372 and 374 (FIG. 3), then, the program 300 causes the microprocessor 30 to execute the step 376 of determining whether the machine 10 (FIG. 2) is in a moistening mode of operation, due to the operator having depressed either one of the seal only or print and seal keys, 122 or 124, and the baffle 21A being positioned for guiding sheets 18 into engagement with the envelope flap deflecting blade 21 for subsequent moistening by the moistening structure 20. In connection with step 376 (FIG. 3) it is noted that for printing purposes, although the machine 10 may be in the print and seal mode of operation, step 348, the sheet feeding speed has been set to high speed of 26″/second, step 358, for printing purposes, step 362. Accordingly, the inquiry of step 376 is made to determine whether the sheet feeding speed should be returned to low speed for processing the next sheet 18. If the next sheet 18 is not one which is to be moistened, then the program 300 causes the microprocessor 30 to execute the step 378 of setting the shutter bar routine flag on, which results in the microprocessor 30 calling up and implementing the shutter bar routine 500 for driving the shutter bar 51D (FIG. 2) back into locking relationship with the drum drive gear 51C to prevent printing. Assuming however that the inquiry of step 376 (FIG. 3) is affirmative, then, before implementation of step 378, the program 300 causes the microprocessor 30 to execute the step 380 of setting the sheet feeding speed of the sheet feeding routine 400 to the low speed of 17.5″/second for envelope moistening purposes. After implementation of step 378, the program 300 causes the microprocessor 30 to execute the step 380 of determining whether the shutter bar time out flag is set, that is, determining whether the shutter bar 51D (FIG. 2) has been timely returned to locking relationship with the postage printing drum drive gear 51C to prevent printing. Assuming the postage printing drum 51 has not been timely locked against rotation then, the program (FIG. 3) 300 causes the microprocessor 30 to execute the step 382 of setting a machine error flag, storing an error code and blinking the service light 125, followed by execution of the steps, 384 and 386, of implementing the shutdown routine 900, clearing the error flag and returning processing to idle 306. If however, the shutter bar time out flag is not set, step 380, indicating that the drum 51C has been timely locked against movement, then, the program 300 causes the microprocessor 30 to execute the step 388 of delaying processing for the time interval sufficient to permit the processed sheet 18 to exit the machine 10, followed by returning processing to idle 306.

As thus constructed and arranged the microprocessor 30 (FIG. 2) and thus the machine 10, includes structure for feeding sheets 18 at speed which is lower then the printing speed for moistening purposes, and, after moistening, feeding such sheets 18 at a higher speed for printing purposes. Moreover, the machine 10 is constructed and arranged for detecting a jam condition at the flap deflecting blade 21, occasioned for example by an operator feeding a sealed envelope 18B to the machine 10 when the machine 10 is in a moistening mode of operation, whereby the baffle 21A is positioned for guiding sheets 18 into rather than out of engagement with the flap deflecting blade 21. Moreover, the machine 10 is constructed and arranged to operate at a low speed for moistening purposes to ensure that sheet feeding may be timely stopped on the occasion of a sheet 18 being jammed against the flap deflecting blade 21, in order to avoid tearing the sheet 18 if it does become jammed, or, if not torn, but slowed down, to avoid wasting postage by not printing the indicia 51E fully and legibly on the sheet 18.

As hereinbefore discussed, in the course of implementation of the main line program 300 (FIG. 3) an inquiry is made at step 308 as to whether or not the test key 270 (FIG. 1) has been actuated. Since the test key 126 is located beneath the cover 128 and is therefore normally inaccessible to an operator of the machine 10, if the test key 126 is actuated it is normally due to a service person having been called in to return the machine 10 back into service after the main line program 300 (FIG. 3) has executed the step, 348, of calling up and implementing a conventional shut down routine, and the operator has been unable to return the machine 10 (FIG. 2) to service. To assist in servicing the machine 10, and, in particular the mailing machine base 12, the microprocessor 30 is programmed to include the service mode routine 800 (FIG. 4), which is called up and implemented by the service person in response to actuation of the test key 126. Assuming the base 12 is energized when the service person arrives to put the machine 10 back into service, then, the error codes which were stored in both the rAM 30A and NVM 30B at any time since the last actuation of the power switch 15A will be stored as current malfunction condition error codes. On the other hand, if the base 12 (FIG. 1) is deenergized upon arrival of the service person, then, the service person will have to reenergize the base 12, with the result that the error codes stored in the RAM 30A will have been cleared therefrom but be stored in the NVM 30B as historical malfunction condition error codes.

Figure 4:
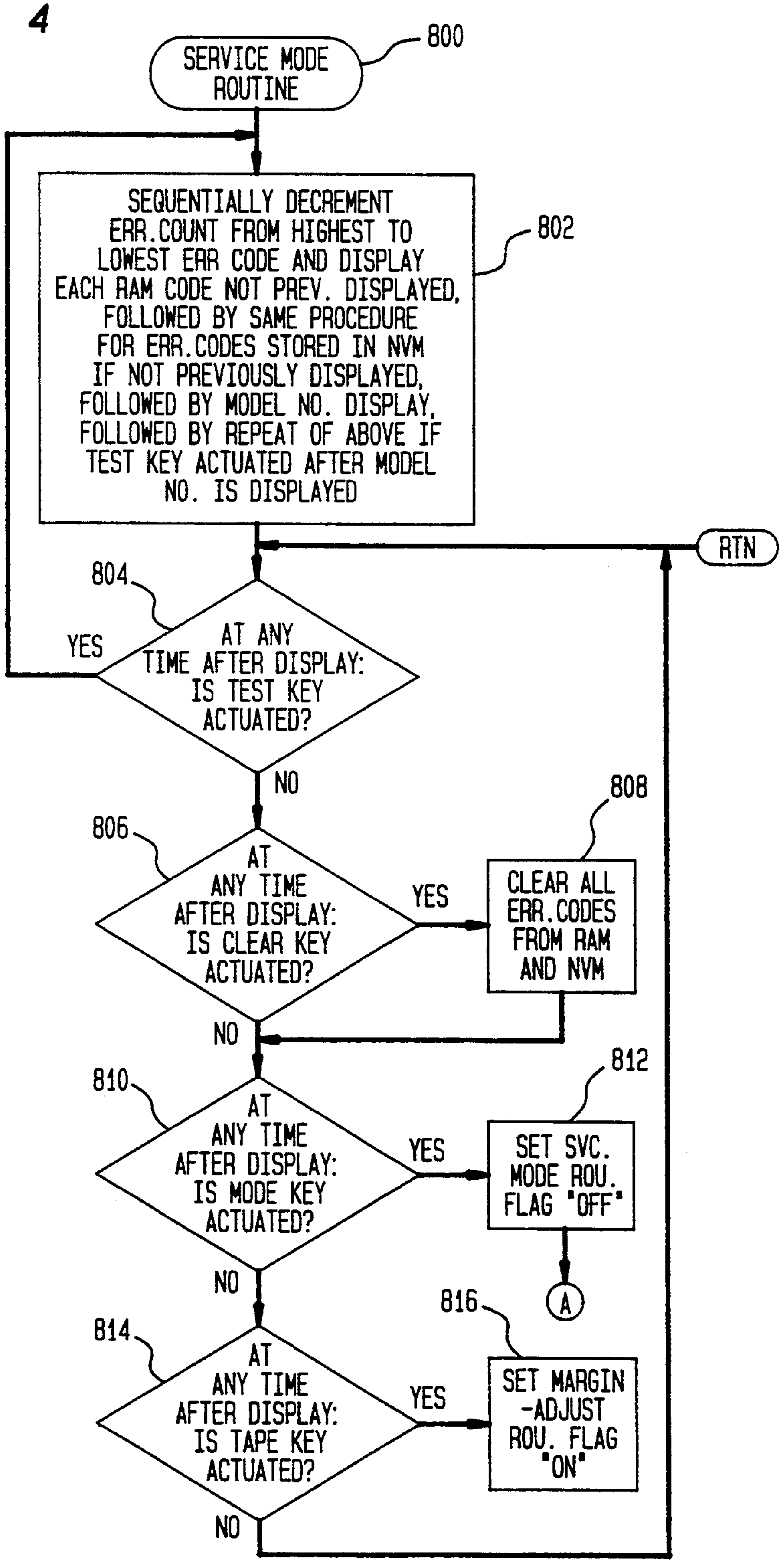
FIG. 4 is a flow chart of the service mode routine according to the invention.

As shown in FIG. 4, the service mode routine 800 commences with the step 802 of setting up a decrementing error counter to a decimal count of 63, which corresponds to the highest octally coded error code i.e., octal error code 76, which may be assigned to any malfunction condition, determining whether or not the octally coded error code corresponding the count of 63 is stored in the RAM, and, if it is, displaying on the LED array 204 (FIG. 2) the octal error code 76, but, if it is not, decrementing the count to a decimal count of 62, displaying the octal error code of 75 if it is stored in RAM, and, if not, again decrementing the decimal count, and so on, until all error codes stored in RAM are displayed. Thereafter, step 802 includes causing the microprocessor 30 to follow the same steps with regard to error codes stored in the NVM 308 which were not previously displayed, followed by causing one of the octal codes 01 through 06, to be displayed to identify the model number of the mailing machine 10 being tested.

In connection with the foregoing remarks concerning step 802 (FIG. 4), it is noted that the service person normally cross-references the octal codes displayed by the LEDs 200 (FIG. 2) to written materials in the possession of the service person to determine the malfunction condition or other meaning corresponding to the each octal code. Accordingly, the service person would be informed by observing each displayed octal code and referencing such written materials that, for example, the postage printing drum 51 has timed out, and, more particularly, that the reason for shut down of the machine 10 is that the difference between one or more of the actual and desired time intervals of initial movement, or acceleration, constant velocity or deceleration, of the printing drum was excessive. Whereupon, the service person, either through experience with the machine 10, or through of appropriate use of trouble-shooting information which may be included with the aforesaid written materials, can cure the problem which caused storage of the time-out error code 67. Moreover, it is noted that in connection with execution of step 802 (FIG. 3), at any time there is a display of an error code either from storage in the RAM or NVM, 30A or 30B, or the display of the machine model number, then, thereafter, the routine 800 causes the microprocessor 30 to implement the step 804 of determining whether or not the test key 125 (FIG. 2) has again been actuated, and, assuming that it has, returns processing to step 802 to decrement the decimal count as hereinbefore discussed to the next current error code stored in the RAM 30A or NVM 30B, as the case may be, or, assuming all error codes have been displayed, to decrement the decimal count to the octal code, 01–06, corresponding to the model number of the machine 10. In addition, assuming that the test key 125, step 804, is not actuated, the routine 800 causes the microprocessor 30 to execute the step 806 of determining whether or not the clear key 129 (FIG. 2) has been actuated, and, assuming that it has, the routine 800 (FIG. 4) then causes the microprocessor 30 to implement the step 808 of clearing all current and historical error codes from both the RAM 30A (FIG. 2) and 30B. Further, assuming that the clear key 125 has not been actuated, step 806 (FIG. 4), then, the routine 800 causes the microprocessor 30 to implement the step 810 of determining whether not one or the mode keys 120, 122 or 124 has been actuated, and, assuming that it has, to implements the step 812 of returning processing to the main line program 300 (FIG. 3) and, in particular, to the idle 306 loop thereof. If however, one of mode keys, 120, 122 has not been actuated, step 810 (FIG. 4), then, the routine 814 causes the microprocessor 122 to implement the step 961 of determining whether or not the tape key 121, which in the service mode of operation acts as margin-adjust, or margin selecting, key, has been actuated. Assuming that the tape, or margin-adjust key 121 has not been actuated, then, processing is returned to step 804. On the other hand, if the tape, or margin-adjust, key 121 has been actuated, step 814, then, the routine causes the microprocessor 30 to execute the step 816 of causing the margin-adjust, or margin selecting, routine 1100 (FIG. 5), hereinafter discussed in detail, to be implemented.

Accordingly, the routine 800 (FIG. 4) is constructed and arranged for sequentially accessing and displaying the data stored in RAM 30A which corresponds to each current malfunction condition, commencing with the highest octally coded error code 76 and ending with the lowest octally coded error code 10, as the test key 125, step 804 is successively actuated. Moreover, after displaying each octal error code, the service person must operate one of six separate keys, i.e., the test key, 125 (FIG. 2), clear key, 129, print key 120, seal key 122, or print and seal key 124 or the tape or margin-adjust key 121, to make a choice between moving on to the next lower numbered error code, step 802 clearing all codes, steps 806 and 808, returning processing to the main line program, steps 810 and 812, or implementing the margin-adjust routine, steps 814 and 816. In this connection it is noted, as hereinafter discussed, that if the tape, or margin-adjust, key 121 (FIG. 2) is actuated to cause implementation of the margin-adjust routine 1100 (FIG. 5), then, exiting the service mode routine 800 (FIG. 4) is not completely realized, inasmuch as upon completion of implementation of the margin-adjust routine 1100 (FIG. 5), processing is returned to the service mode routine 800 (FIG. 4).

Figure 5:
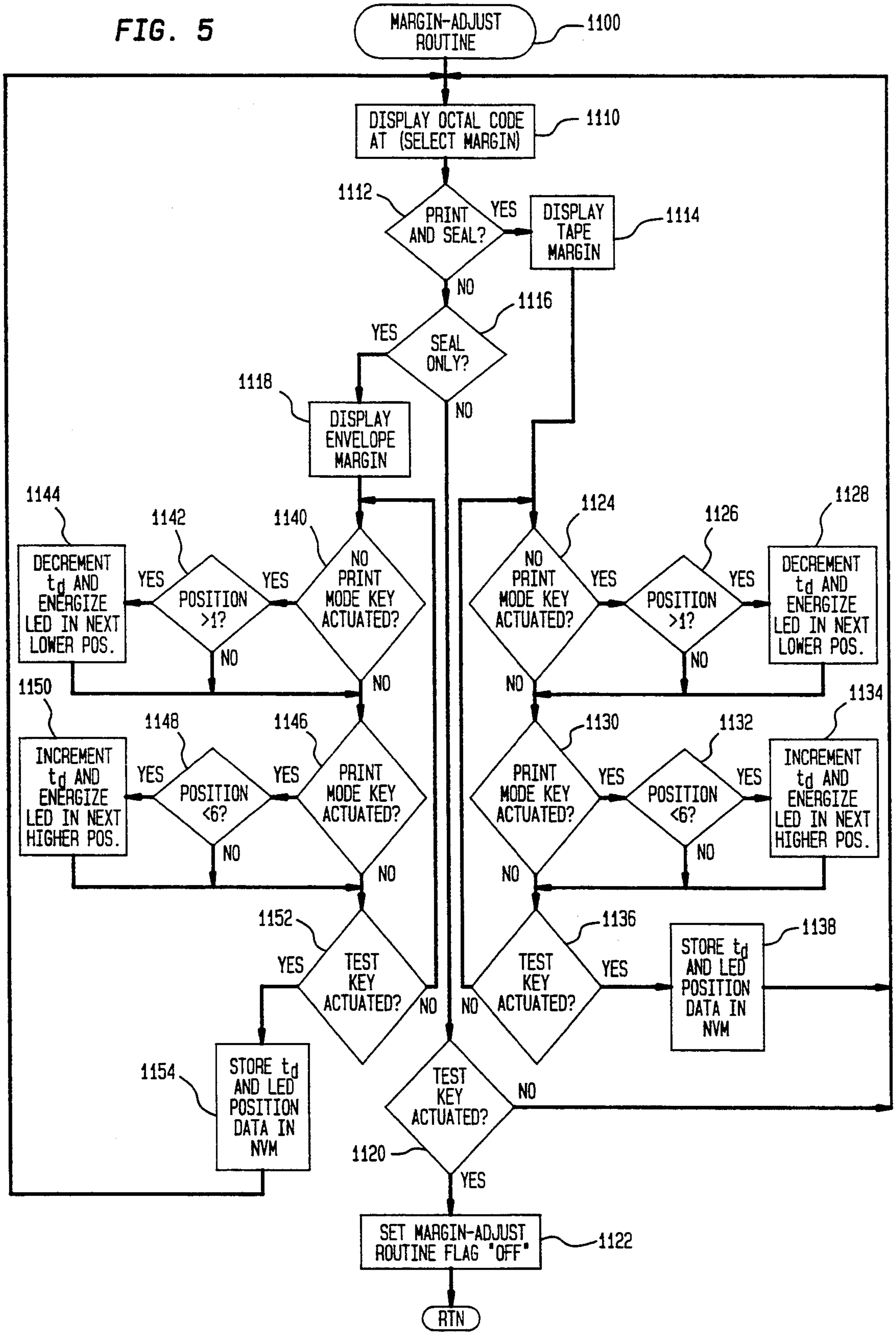
FIG. 5 is a flow chart of the improved margin-adjusting routine according to the invention.

Assuming as hereinabove discussed that the service mode routine 800 (FIG. 4) is being implemented and the operator is desirous of adjusting the marginal distance 51E from the leading edge of either a tape 18A or envelope 18B at which the indicia 51E is to be printed thereon, then the operator is obliged to actuate the tape keys 121, which, in the service mode of operation, results in the microprocessor 30 calling up and implementing the margin adjusting, or margin selecting routing 1100 (FIG. 5). As shown in FIG. 5, according to the invention the margin-adjust, or margin selecting, routine 1100 commences with the step 1100 of displaying the octal code "07" which is preferably a prompt informing the service person, by cross-reference to written materials if such information is not committed to memory, that a selection must be made to either operate the test key 125 to exit the margin adjusting routine 1100 or use the margin-adjust routine 1100 for adjusting the set back of indicia printing for tapes 18A or envelopes 18B. Accordingly, upon displaying the octal code 07, step 1110, the routine 1100 causes the microprocessor 30 to execute the step 1112 of determining whether the print and seal key 124 is actuated, and, assuming that it is, causes the microprocessor 30 to execute the step 1114 of deenergizing the LED 202 (FIG. 2) displaying the prompt code 07 and energizing the appropriate LED 202 in the LED array 204 which indicates the currently selected distance 51F from the leading edge 100 of a tape 18A at which the indicia 51E will be printed. On the other hand, assuming that the print and seal key 124 is not actuated, step 1112 (FIG. 5), then, the routine 1100 causes the microprocessor 30 to execute the step 1116 of determining whether the seal only key 122 is actuated, and, assuming it is, causes the microprocessor 30 to execute the step 1118 of deenergizing the LED 202 (FIG. 2) displaying the prompt code 07 and energizing the appropriate LED 202 in the LED array 204 which indicates the currently selected distance 51F from the leading edge 100 of an envelope 18B at which the indicia 51E will be printed. Assuming however, that the inquiry of step 1116 is negatively answered, then, the routine 1100 causes the microprocessor 30 to execute the step 1120 of determining whether or not the test key 125 (FIG. 2) is actuated. And, assuming that the test key 125, step 1120, is not actuated, the routine 1100 causes the microprocessor 30 to return processing to step 1110. On the other hand, assuming that the test key 125, step 1120, is actuated, then, the routine 1100 causes the microprocessor 30 to execute the step 1122 of setting the margin-adjust routine flag "off" followed by returning processing to the service mode routine 800 (FIG. 4). Accordingly, when the margin-adjust routine 1100 is called up by the service person having actuated the tape or margin-adjust key 121, in the course of implementation of the service mode routine 800 (FIG. 4), the service person is prompted by the display of the "07" octal code to either to actuate the print and seal key 124 to select tape margin adjustment, actuate the seal only key to select envelop margin adjustment, or actuate the test key 125 to exit the margin adjust routine 1110, failing which, the routine 1110 continuously loops through steps 1110, 1112, 1116 and 1120 until one of the keys, 122, 124, or 125 is actuated.

Referring back to step 1114 (FIG. 5) and assuming that the currently selected tape indicia printing margin 51F is displayed, due to the print and seal key 124 having been actuated step 1112, the routine 1110 then causes the microprocessor 30 to execute the step 1124 of successively determining whether the print key 120 or seal only key 122 (FIG. 2) has been actuated. Assuming the seal only or no-print key 122 has been actuated, step 1124 (FIG. 5) the routine 1110 causes the microprocessor 30 to execute the step 1126 of determining whether the the LED 202 (FIG. 2) which is energized is either located in the right most position in the LED array 204, which position corresponds to the position of the LED 202 labeled with the numeral 1, or is located in a higher numbered position, i.e., 2-6 in the LED array 204, which positions respectively correspond to the positions of the LEDs 202 labeled with the numerals 2-6. Assuming the energized LED 202 is in a position greater than the numeral 1, i.e., to the left of the LED 202 labeled numeral 1, then, upon actuation of the no-print key 122 the routine 1100 causes the microprocessor 30 to execute the step 1128 of energizing the LED 202 in the next lower numbered position, i.e. 5-1, for illumination thereof, and causes a time delay $t_d$ for tape printing, as measured from the time instant that the trip sensor 99A (FIG. 2) senses the leading edge 100 of a tape 18A in the path of travel 36 to the time instant of commencement of acceleration of the print drum 51, to be decremented by a time interval which causes the printing drum 51 to print postage indicia 51E on the tape 18A substantially one-eighth of an inch closer to the leading edge 100 of the tape 18A than it would have been printed if the no-print or seal only key 122, step 1124 (FIG. 5) had not been actuated. Assuming however, that the no print key 122, step 1124, is not actuated, or the energized LED 202 (FIG. 2) is not an LED 202 in one of the positions 2-6 inclusive, step 1126 (FIG. 5), and, therefore, step 1128 is not implemented, then the routine 1100 implements the step 1130 of determining whether or not the print key 120 (FIG. 2) is actuated and, assuming that it is, implements the step 1132 of determining whether or not the LED 202 (FIG. 2) which is iluminated is in a position of the LED array 204 which is less than position 6, that is, in one of the positions 5-1. Assuming that the illuminated LED 202 is in a position of the array 204 which is less than the position 6, i.e., to the right of the LED 202 labeled numeral 6, then, actuation of the print mode key 120 results in the routine 1110 (FIG. 5) causing the microprocessor 30 to execute the step 1134 of energizing the LED 202 in the next higher numbered position, i.e., 2-6, for illumination thereof and causing the tape printing time delay $t_d$ (FIG. 5) to be incremented by a time interval which causes the printing drum 51 (FIG. 2) to print postage indicia 15E on the tape 18A substantially one-eighth of an inch farther from the leading edge 100 of the tape 18A than it would have been printed if the print mode key 120, step 1130 (FIG. 5) had not been actuated. Assuming however, that the print key 120, step 1130, is not actuated, or the energized LED 202 (FIG. 2) is not an LED 202 in one of the positions 5-1 inclusive step 1132 (FIG. 5), and, therefore, step 1134 is not implemented, then, the routine 1100 causes the microprocessor 30 to implement the step 1136 of determining whether or not the test key 125 is actuated, and, assuming that it is, returns processing to step 1124. Whereupon, the routine 1100 continuously loops through steps 1124, 1130, and 1136 until one or the other of the print or no-print keys, 120 or 122 or the test key 125, is actuated, with the result that either steps 1126 or 1128, or steps 1132 or 1134, are implemented as hereinbefore discussed, or, in response to actuation of the test key 125, step 1136, the routine 1100 implements the step 1138 of storing in the NVM 30B the position number, i.e. 1-6, corresponding to the distance from the leading edge 100 of the tape 18A at which postage indicia 51E will be printed thereon. Preferably, the right most LED 202 (FIG. 2) in the LED array 204 i.e., position 1, corresponds to printing postage indicia 51E on the tape 18A a marginal distance 51F of one-eighth of an inch upstream from the leading edge 100 of the tape 18A, whereas the leftmost LED 202 in the LED array 204, i.e., position 6, corresponds to printing postage indicia 51E on the tape 18A a distance 51F of three quarters of an inch upstream from the leading edge 100 of the tape 18A. And, as hereinbefore noted, the postage indicia position, 1-6, may be selectively incremented or decremented one position at a time to or from positions 1 through 6 for changing the marginal distance 51F of displacement of the postage indicia 51E upstream from the leading edge 100 of a tape 18A in one-eighth of an inch increments to or from a marginal distance 51F of from one-eighth of an inch through three quarters of an inch. Upon completion of step 1138, the routine 1100 causes the microprocessor 30 to return processing to step 1110 for further processing, for example, to permit the service person to either actuate the seal only key 122, step 1116, for envelope, indicia-printing, margin adjustment purposes, or actuate the test key 125, step 1120, for returning processing to the service mode routine 800 (FIG. 4). Ordinarily, after confirming that the currently selected tape marginal distance, step 1114 (FIG. 5), or selecting the marginal distance upstream from the leading edge 100 (FIG. 2) of a tape 18A at which the postage indicia 51E will be printed, the service person would actuate the seal only key 122, step 1116, to cause the routine 1100 to display the currently selected envelope marginal distance, step 1118, to be sure that it comports with the customer's needs before actuating the test key 125 to exit the margin adjust routine 1110. And, assuming that the currently selected, envelope, indicia-printing, marginal distance 51F did not comport with the customer's needs, then, the service person would, upon display of the envelope marginal distance 51F, step 1118, toggle the appropriate print or no-print key, 120 or 122, in the same manner and for the same reasons as hereinbefore discussed in the course discussing adjustment of the tape, indicia-printing, marginal distance 51F, in order to then select the envelope, indicia-printing, marginal distance 51F, with the result that the routine 1100 would cause the microprocessor 30 to execute the appropriate steps, 1140 through 1154, corresponding to steps 1124 through 1138 as hereinbefore discussed. In this connection it is noted that the time delay td from the trip sensor 96 sensing the leading edge 100 of a sheet 18, other than a tape 18A, to the time of commencement of the drum printing cycle, i.e., acceleration of the drum 51 for printing, is different from the corresponding tape time delay td hereinbefore discussed. Thus, separately selected time delays td are stored in the NVM 30B for the tape marginal distance 51F and envelope, marginal edge 51F. Moreover, rather than adjusting the envelope marginal distance 51F in one-eighth of an inch increments as discussed above for the tape, implementation of steps 1140 through 1154 results in adjusting the envelope marginal distance in one-fourth of an inch increments. Aside from the foregoing, upon implementation of step 1154, the routine 1100 causes processing to again be returned to step 1110. Whereupon, the service person would ordinarily actuate the test key 125, step 1120, to cause the microprocessor 30 to execute the step 1122 of setting the margin adjusting routine flag "off" followed by returning processing to the service mode routine 800 (FIG. 4) hereinbefore discussed.

Figure 6:
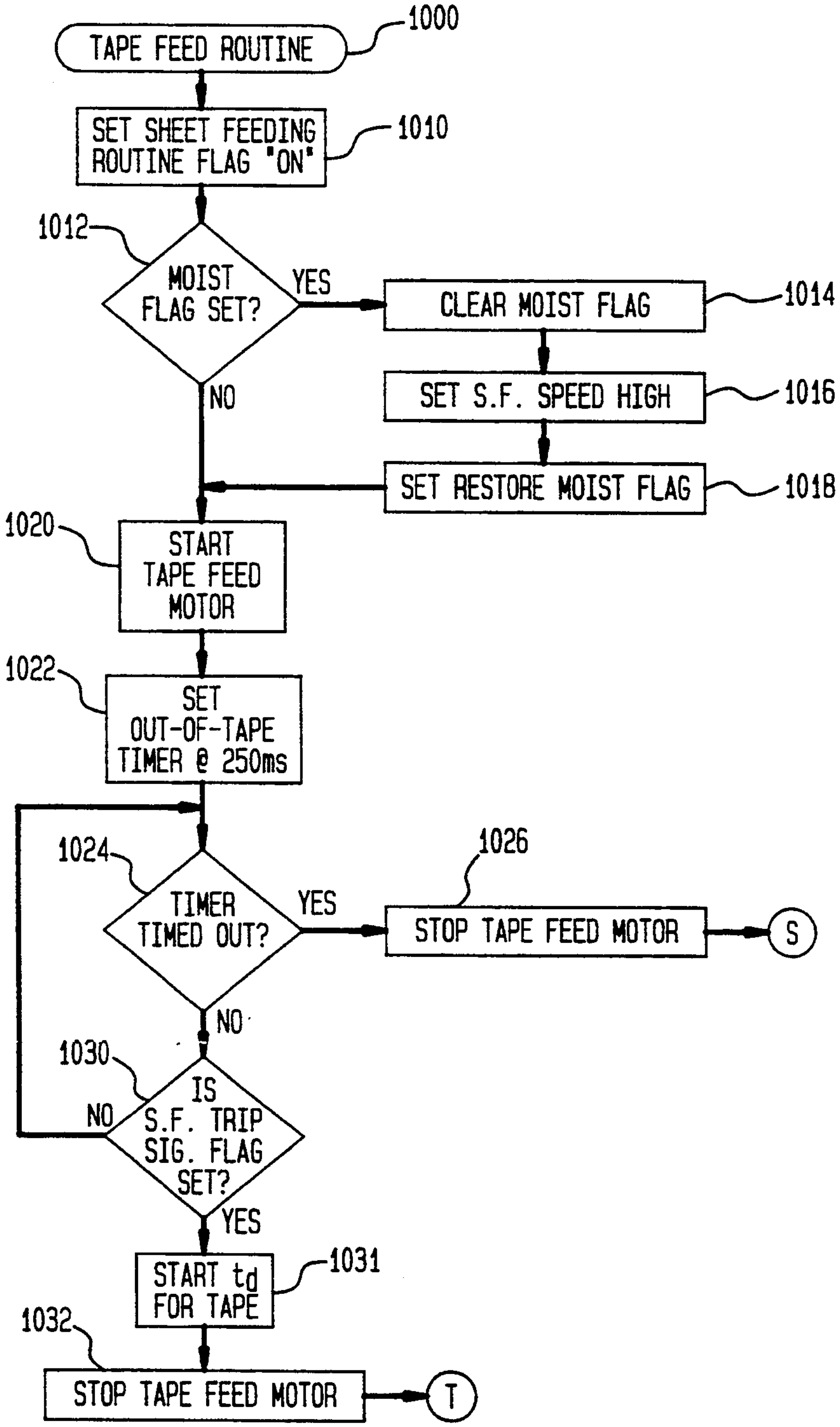
FIG. 6 is a flow chart of the tape feeding routine according to the invention.
Figure 7:
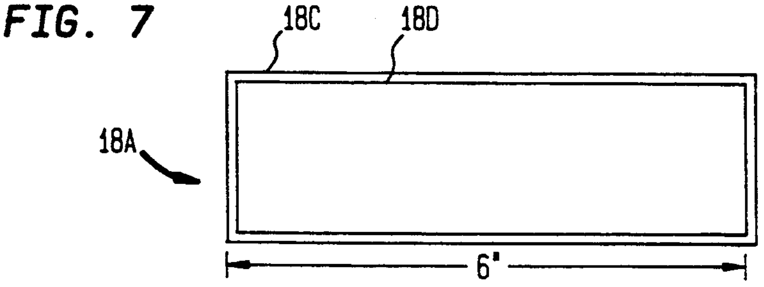
FIG. 7 is a top plan view of a typical cut tape according to the invention.

As previously noted, in the course of discussing the main line program 300 (FIG. 3), if the inquiry of step 323 is affirmatively answered, the program 300 causes the microprocessor 30 to call up and implement the tape feeding routine 1000 (FIG. 6). As shown in FIG. 6, the tape feeding routine 1000 commences with the step 1010 of setting the sheet feeding routine flag "on". Whereupon the microprocessor 30 commences execution of the sheet feeding routine 400 (FIG. 2), resulting in the input sheet feeding rollers 17B being conventionally accelerated to the high sheet feeding speed of 26"/second. Accordingly, when a tape 18A is processed by the machine 10, rather than sheet feeding being commenced in response to a sheet 18 being detected by the sensor 92 (FIG. 2), as hereinbefore discussed in the course of discussing step 328 of the main line program 300 (FIG. 3), sheet feeding is commenced in response to actuation of the tape key 121. As the sheet feeding routine 400 is being implemented, the tape routine 1000 (FIG. 6) causes the microprocessor 30 to execute the step 1012 of determining whether or not the moistening flag is set, which step 1012 is concerned with determining whether or not the baffle 21A (FIG. 2) is disposed for guiding sheets 18 into or out of engagement with the flap deflecting blade 21 for moistening purposes. In this connection it is noted that assuming the moistening flag is set, step 1012, then, the sheet feeding speed is set at the "low" speed of 17½"/second for moistening purposes and the baffle 21A (FIG. 2) is disposed above the deck 17 for guiding sheets 18 into engagement with the flap deflecting blade 21. On the other hand, cut tapes 18A are not intended to be moistened due to their being conventional composites, tapes 18A (FIG. 7) which include a suitable six-inch substrate of paper 18*c* overlaid with a removable, gummed, adhesive, strip of paper 18D which is peeled from the substrate 18C for application to a parcel for mailing purposes after postage indicia 51E (FIG. 2) is printed thereon. Accordingly, assuming the moistening flag is set, step 1012 (FIG. 6), the tape routine 1000 causes the microprocessor 30 to execute the step 1014 of clearing the moistening flag, which results in the microprocessor 30 implementing the baffle routine 700 (FIG. 2) for moving the baffle 21A to the non-flap moistening position, followed by the step 1016 of setting the sheet feeding speed of the sheet feeding routine 400 to the "high" speed of 26"/second, and then the step of setting the restore moistening flag "on" to ensure that when a sheet 18, other than a tape 18A, is subsequently fed to the machine 10, the moistening flag in the main line program 300 (FIG. 3) is reset at step 314 to cause the microprocessor 30 to move the baffle 21A (FIG. 2) back to the flap moistening position. Assuming that either the inquiry of step 1012 (FIG. 6) is negatively answered, or step 1018 is implemented for later restoration of the moistening flag as hereinbefore discussed, then, the routine 1000 causes the microprocessor 30 to execute the step 1020 of starting the sheet feeding motor 26D (FIG. 2) for feeding a cut tape 18A from the receptacle 22A and into the nip 17C of the input sheet feeding rollers 17B for feeding thereby downstream in the path of travel 36 on the deck 17. Thereafter, the routine 1000 causes the microprocessor 30 to execute the step 1022 of setting an out-of-tape timer 30D for timing out at the end of a predetermined time interval of preferably 250 milliseconds. Thereafter, the routine 1000 causes the microprocessor 30 to execute the step 1024 of determining whether or not the timer of step 1022 has timed out, and, assuming that it has not, the routine 1000 causes the microprocessor 30 to execute the step 1030 of determining whether or not the sheet feeding trip signal flag is set, step 1030. Assuming that the inquiry of step 1030 is negatively answered, then, the routine cause the microprocessor 30 to return processing to step 1024, and continuously loop through steps 1024 and 1030 until the inquiry of step 1024 is affirmatively answered before the inquiry of step 1030 is affirmatively answered, or the inquiry of step 1030 is affirmatively answered before the inquiry of step 1024 is affirmatively answered. Assuming the inquiry of step 1024 affirmatively answered before the inquiry of step 1030 is affirmatively answered, then, the routine 1000 causes the microprocessor 30 to execute the step 1026 of stopping the tape feeding motor 26D (FIG. 2), followed by returning processing to the main line program 300 (FIG. 3) for implementation of the successive steps of execution of the shut down routine 900, step 384, clearing the error flag, step 386 and returning processing to idle, step 306. Assuming however, as in the normal case, that the inquiry or step 1030 (FIG. 6) is affirmatively answered before the inquiry of step 1024 is affirmatively answered, then, the routine 1000 causes the microprocessor 30 to execute the step 1031 of starting one of the timers 30D (FIG. 2) to commence counting a predetermined time interval td from the time instant that the leading edge 100 of the cut tape 18A is sensed by the sheet detection sensor 96 before microprocessor 30 will commence driving the printing motor 26B and thus the drum 51 through a printing cycle commencing with accelerating the postage printing drum 51 from rest. Thereafter, the routine 1000 causes the microprocessor 30 to execute the step 1032 of causing the tape feeding motor 26D (FIG. 2) to stop feeding the tape 18A from the receptacle 22A, since the tape 18A which has been fed therefrom has been engaged by the input sheet feeding rollers 17B and fed thereby downstream in the path of travel 36 a sufficient distance to have caused the trip sensor 96 to have detected the leading edge 100 thereof and provided a trip signal 102 to the microprocessor 30. Upon execution of step 1032 (FIG. 6), the routine 1000 then causes the microprocessor 30 to return processing to the main line program 300 for execution of the step 342 of setting the shutter bar routing flag "on", which step commences the printing related processing steps hereinbefore discussed. Accordingly, the tape routine 1000, commenced by the main line program 300 (FIG. 3) at step 314 is returned to the main line program 300 at step 342, after having bypassed all intermediate steps therebetween. Thus the tape routine 1000 bypasses the sheet feeding flag setting step 328, all of the sheet length processing steps of the main line program 300, the inquiry of step 340 as to whether or not a print mode key, 120 or 124, has been actuated, and does not start a count of a jam time delay tj. Accordingly, the tape feeding routine 1000 (FIG. 6) takes over control of commencement of the sheet feeding routine 300, step 1010, and, in addition, takes over the start of the time delay td to commencement of a printing cycle, step 1031. Moreover, since the tape routine 1000 is returned to the mainline program 300 after step 340 thereof, with the result that the program 300 causes execution of step 342 without determining whether a print mode key, 120 or (FIG. 2) or 124, has been actuated, it follows that whenever a tape 18A is processed by the machine 10, the machine 10 implements the printing routine 600. Further, although rotation of the input sheet feeding rollers 17B (FIG. 2) is commenced before a tape 18A is fed to the nip 17C of the input sheet feeding rollers 17B, and acceleration of such rollers 17B to the "high" sheet feeding speed of 26"/second is commenced before commencing feeding the tape 18A into the nip 17C between the rollers 17B for take away thereby from the receptacle 22A, step 1020 (FIG. 6), the tape feeding roller 23 (FIG. 2) is preferably driven by the motor 26D a sufficient time period to feed a tape 18A beneath the upper input roller 17B, against the force of the spring 17C, to the sensor 96 for detection thereby. Accordingly, both the tape roller 23 and input sheet feeding rollers 17B feed the tape 18A to the sensor from the nip 17C of the input sheet feeding rollers 17B. On the other hand, the input sheet feeding rollers 17B are relied upon for completion of the task of feeding the tape 18A from the tape receptacle 22A.

What is claimed is:

1. A mailing machine for processing respective sheets including envelopes which each have a body and a flap and including cut tapes which each have a substrate portion and an adhesive tape portion removably connected thereto, the machine comprising:

(a) means for feeding each sheet in a predetermined path of travel extending downstream through the machine, the sheet feeding means including oppositely spaced input rollers defining a nip therebetween;

(b) means for feeding a cut tape;

(c) means for controlling the feeding means, the controlling means including a microprocessor, the controlling means including means upstream from the nip of the input rollers for sensing a sheet fed to the machine and providing a corresponding first sensing signal to the microprocessor, the microprocessor programmed for causing the sheet feeding means to commence feeding in response to receiving the first sensing signal, the controlling means including a switch connected to the microprocessor and providing a switch signal thereto in response to actuation of the switch, and the microprocessor programmed for causing the sheet feeding means followed by the cut tape feeding means to commence feeding in response to receiving the switch signal.

2. The mailing machine according to claim 1, wherein the controlling means includes means downstream from the nip of the input rollers for sensing each sheet in the path of travel and providing a corresponding second sensing signal to the microprocessor, and the microprocessor programmed for causing the out tape feeding means to stop feeding in response to receiving the second sensing signal.

3. The mailing machine according to claim 2 including the microprocessor programmed for discriminating between sheets having different lengths, and the microprocessor programmed for bypassing the sheet length discriminating program after the cut tape feeding means commences feeding if the second sensing signal is received by the microprocessor.

4. The mailing machine according to claim 2 including the microprocessor programmed for causing the cut tape feeding means to stop feeding a predetermined time interval from starting feeding if the second sensing signal is not timely received.

5. The mailing machine according to claim 2 including a supply of a plurality of cut tapes, said tape roller is disposed in feeding engagement with is one of the cut tapes of the supply, the sheet feeding means including a spring for urging one of the input rollers toward the opposite input roller, and said tape roller feeding said cut tape into the nip of the input rollers against the force exerted by the spring and downstream in the path of travel for sensing by the second sensing means.

6. The mailing machine according to claim 5, wherein the sheet feeding means feeds said cut tape concurrently with the cut tape feeding means feeding said cut tape, and the sheet feeding means continues feeding the cut tape downstream in the path of travel when the cut tape feeding means stops feeding.

7. The mailing machine according to claim 1, wherein the cut tape feeding means includes a d.c. motor and a tape feed roller disposed in feeding engagement with the cut tape, and the d.c. motor directly connected to the tape feed roller.

8. The mailing machine according to claim 1 including envelope flap moistening means downstream from the nip of the input feed rollers, the moistening means including a baffle, the moistening means including means for moving the baffle between a flap moistening position for guiding envelopes towards the moistening means and a non-flap moistening portion for guiding envelopes away from the moistening means, and the microprocessor programmed for causing the baffle moving means to move the baffle to the non-flap moistening position when the switch is actuated and before the cut tape feeding means commences feeding.

9. The mailing machine according to claim 8, wherein the controlling means includes means downstream from the nip of the input rollers for sensing each sheet in the path of travel and providing a corresponding second sensing signal to the microprocessor, and the microprocessor programmed for causing the cut tape feeding means to stop feeding in response to receiving the second sensing signal.

10. The mailing machine according to claim 9, wherein the microprocessor is programmed for causing the baffle moving means to move the baffle to the flap moistening position if tape feeding is stopped.

11. The mailing machine according to claim 9, wherein the microprocessor is programmed for setting a restore moistening flag when the switch is actuated and before the cut tape feeding means commences feeding, and the microprocessor is programmed for causing the baffle moving means to move the baffle to the flap moistening position in response to the restore moistening flag being set if tape feeding is stopped.

12. The mailing machine according to claim 8, including the microprocessor programmed for determining the position in which the baffle is disposed before causing the cut tape feeding means to commence feeding, said microprocessor programmed for causing the cut tape feeding means to commence feeding if said determination is that the baffle is disposed in the non-flap moistening position and said switch is actuated, and said microprocessor programmed for causing the baffle moving means to move the baffle to the non-flap moistening position if said determination is that the baffle is in the flap moistening position and said switch is actuated.

13. The mailing machine according to claim 1 wherein the microprocessor is programmed for causing the sheet feeding means to feed sheets at a high speed and a low speed, and the microprocessor programmed for causing the sheet feeding means to feed at the high speed when the switch is actuated and before the cut tape feeding means commences feeding.

* * * * *